(12) United States Patent
Fratta

(10) Patent No.: US 7,221,071 B2
(45) Date of Patent: May 22, 2007

(54) SYNCHRONOUS ELECTRICAL MACHINE

(75) Inventor: Antonino Fratta, Turin (IT)

(73) Assignees: C.R.F. Societa Consortile per Azioni, Orbassano (Tornio) (IT); Tree di Fratta Antonino S.A.S., Turin (IT)

( * ) Notice: Subject to any disclaimer, the term of this patent is extended or adjusted under 35 U.S.C. 154(b) by 0 days.

(21) Appl. No.: 10/526,066

(22) PCT Filed: Aug. 28, 2003

(86) PCT No.: PCT/EP03/09542

§ 371 (c)(1),
(2), (4) Date: Feb. 28, 2005

(87) PCT Pub. No.: WO2004/021550

PCT Pub. Date: Mar. 11, 2004

(65) Prior Publication Data

US 2005/0258700 A1    Nov. 24, 2005

(30) Foreign Application Priority Data

Aug. 29, 2002  (IT) .......................... TO2002A0757

(51) Int. Cl.
*H02K 21/14* (2006.01)
*H02K 1/27* (2006.01)

(52) U.S. Cl. .................. 310/156.53; 310/156.53; 310/156.56; 310/162; 310/254

(58) Field of Classification Search .............. 310/216, 310/254, 162, 156.53, 156.56

See application file for complete search history.

(56) References Cited

U.S. PATENT DOCUMENTS

| 3,343,017 | A | * | 9/1967 | Pop ............................ 310/266 |
| 4,112,319 | A | * | 9/1978 | Field ........................ 310/49 R |
| 4,385,250 | A | * | 5/1983 | Welburn ..................... 310/162 |
| 4,672,253 | A | * | 6/1987 | Tajima et al. ............... 310/269 |
| 5,801,478 | A |   | 9/1998 | Nashiki |
| 5,818,140 | A |   | 10/1998 | Vagati |
| 6,239,526 | B1 |   | 5/2001 | Jung et al. |
| 6,744,171 | B1 | * | 6/2004 | Kolomeitsev ............... 310/254 |
| 7,038,345 | B2 | * | 5/2006 | Fratta ..................... 310/156.53 |
| 2001/0048264 | A1 |   | 12/2001 | Trago et al. |

* cited by examiner

*Primary Examiner*—Tran Nguyen
(74) *Attorney, Agent, or Firm*—Sughrue Mion, PLLC

(57) ABSTRACT

The electric machine (M) comprises an armature (A) and an inductor (B), the inductor (B) having for each pair of poles (N, S) of the armature (A), n teeth (20) identical to one another and n slots (21) and being provided with a winding (W) housed in the said n slots. The armature (A) has its surface facing the air gap (G) divided into 2N elements or samples (1–12) with N being a whole multiple of n, having substantially the same extent in the said direction of relative displacement, and having a respective magnetic potential value. Each sample (1–12) of the armature (A) is associated with a value of total magnetic permeance ($p_t$) at the air gap (G) in a predetermined alignment condition between the inductor (B) and the armature (A). The armature (A) comprises a plurality of magnetically distinct ferromagnetic bodies (30, 31, 32; . . . ) each of which couples at least two armature samples in such a way as to ensure a substantial magnetic equipotentiality.

26 Claims, 30 Drawing Sheets

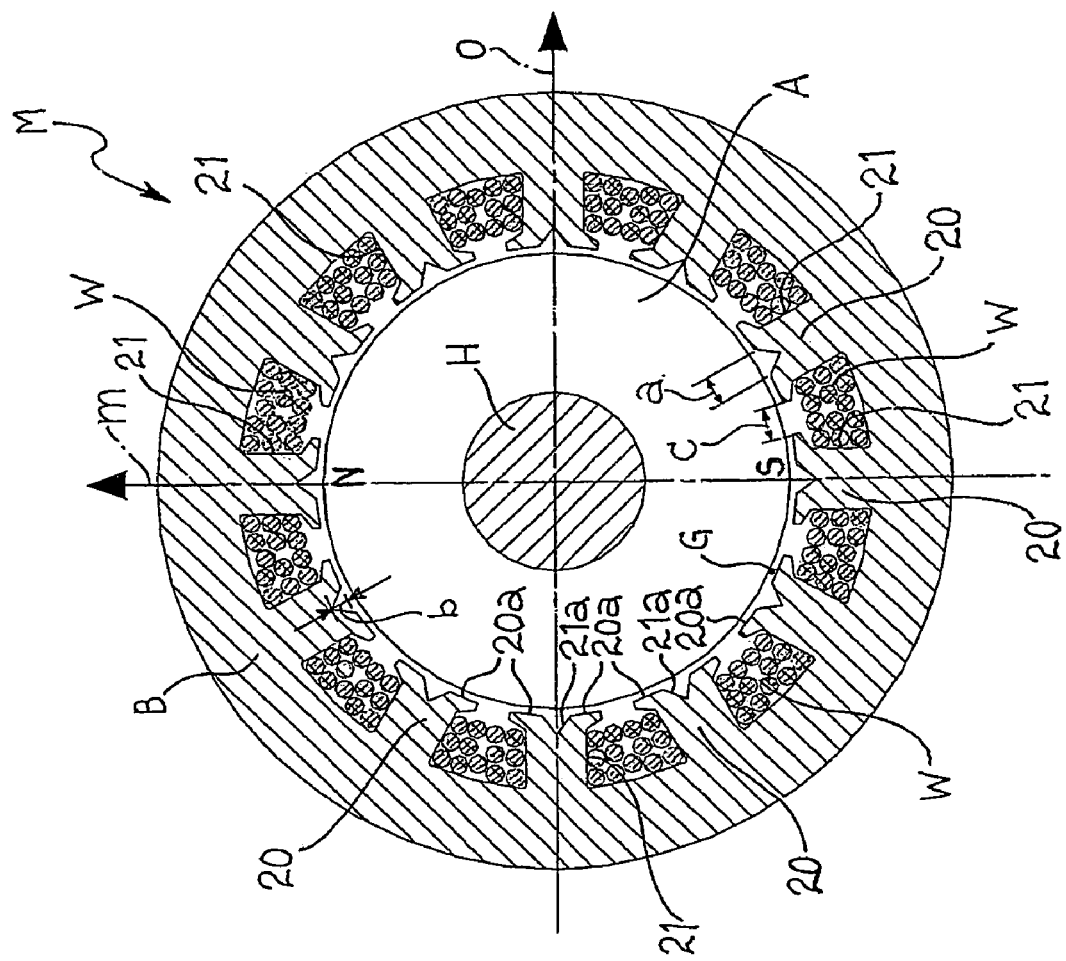

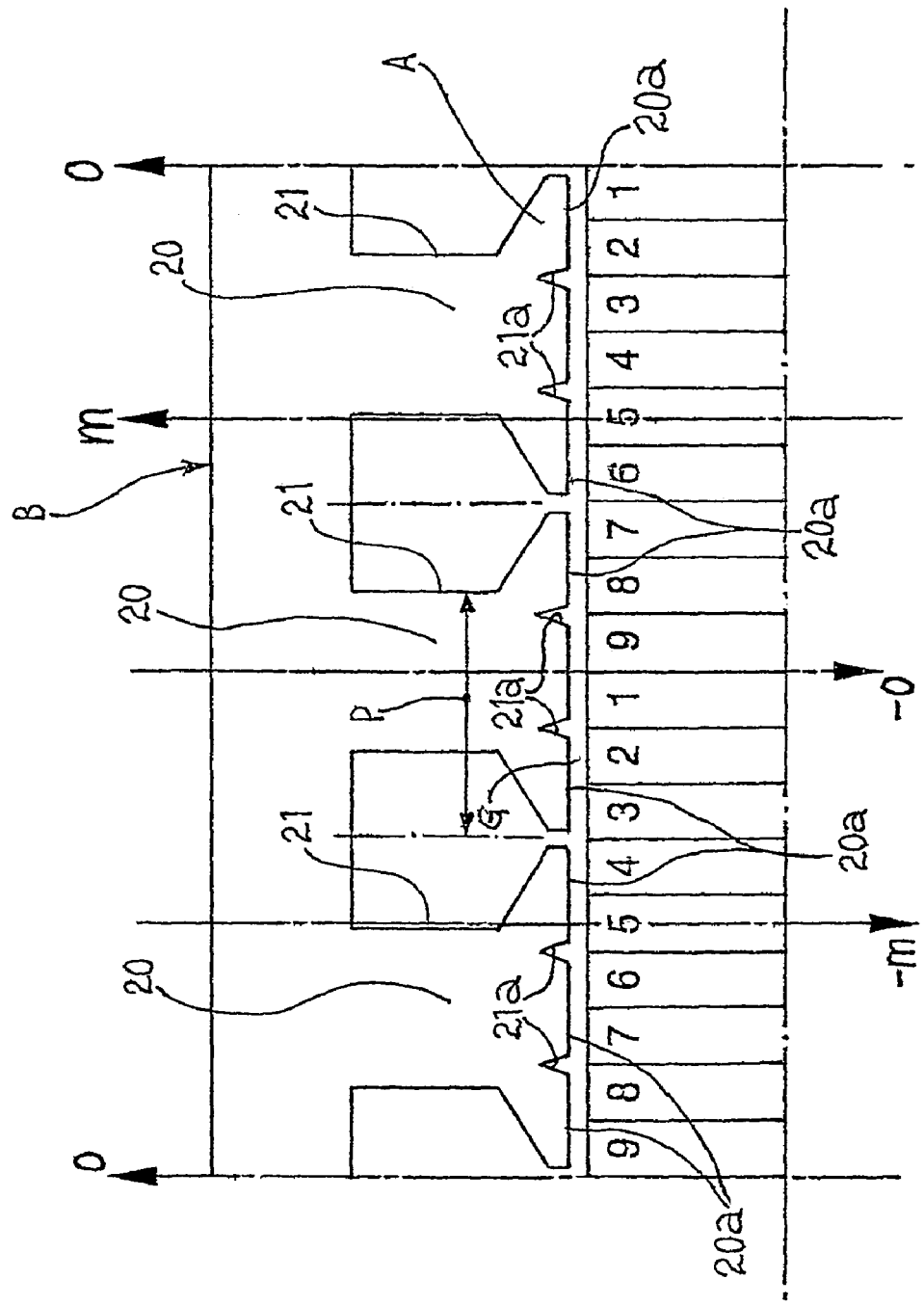

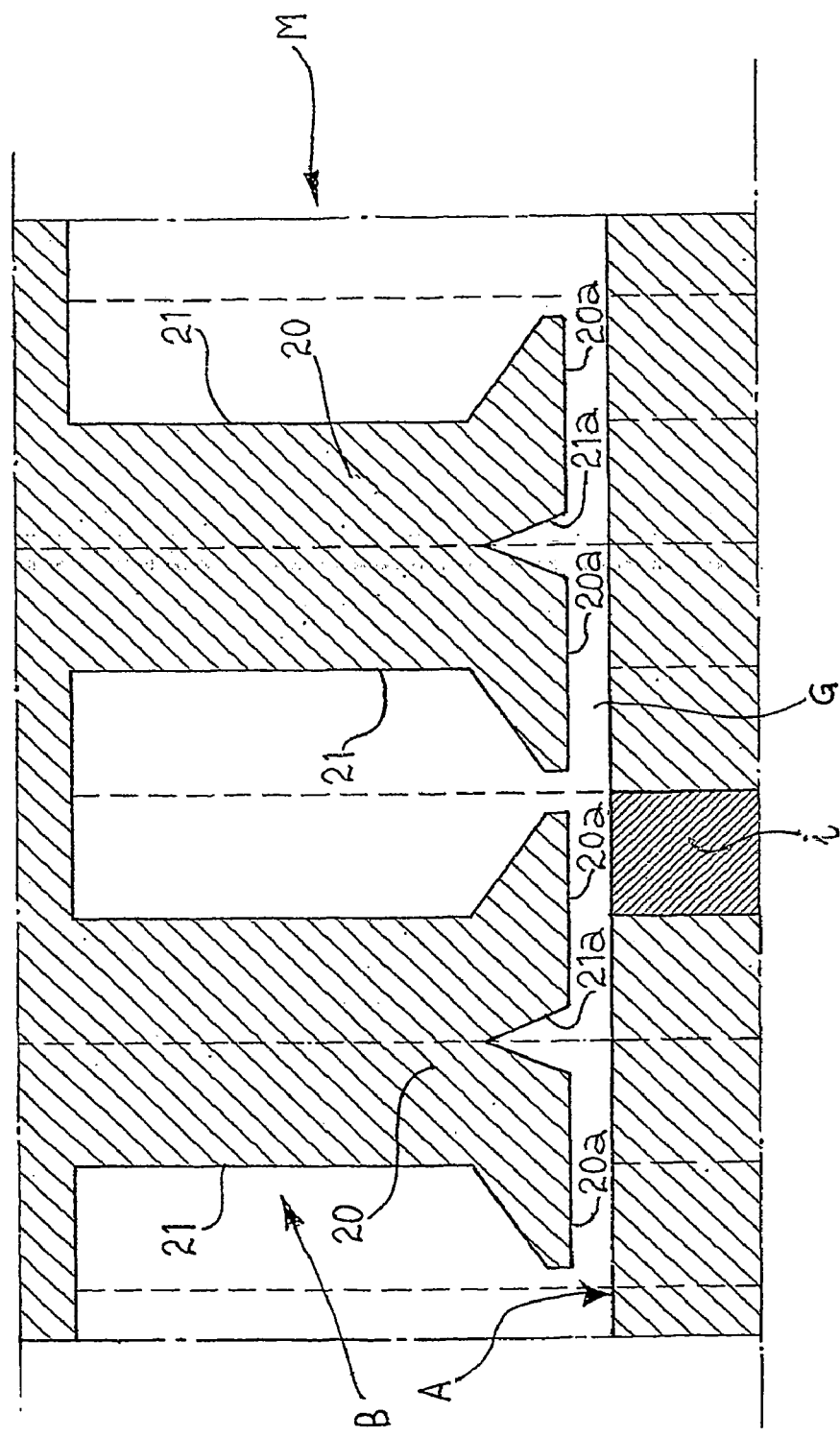

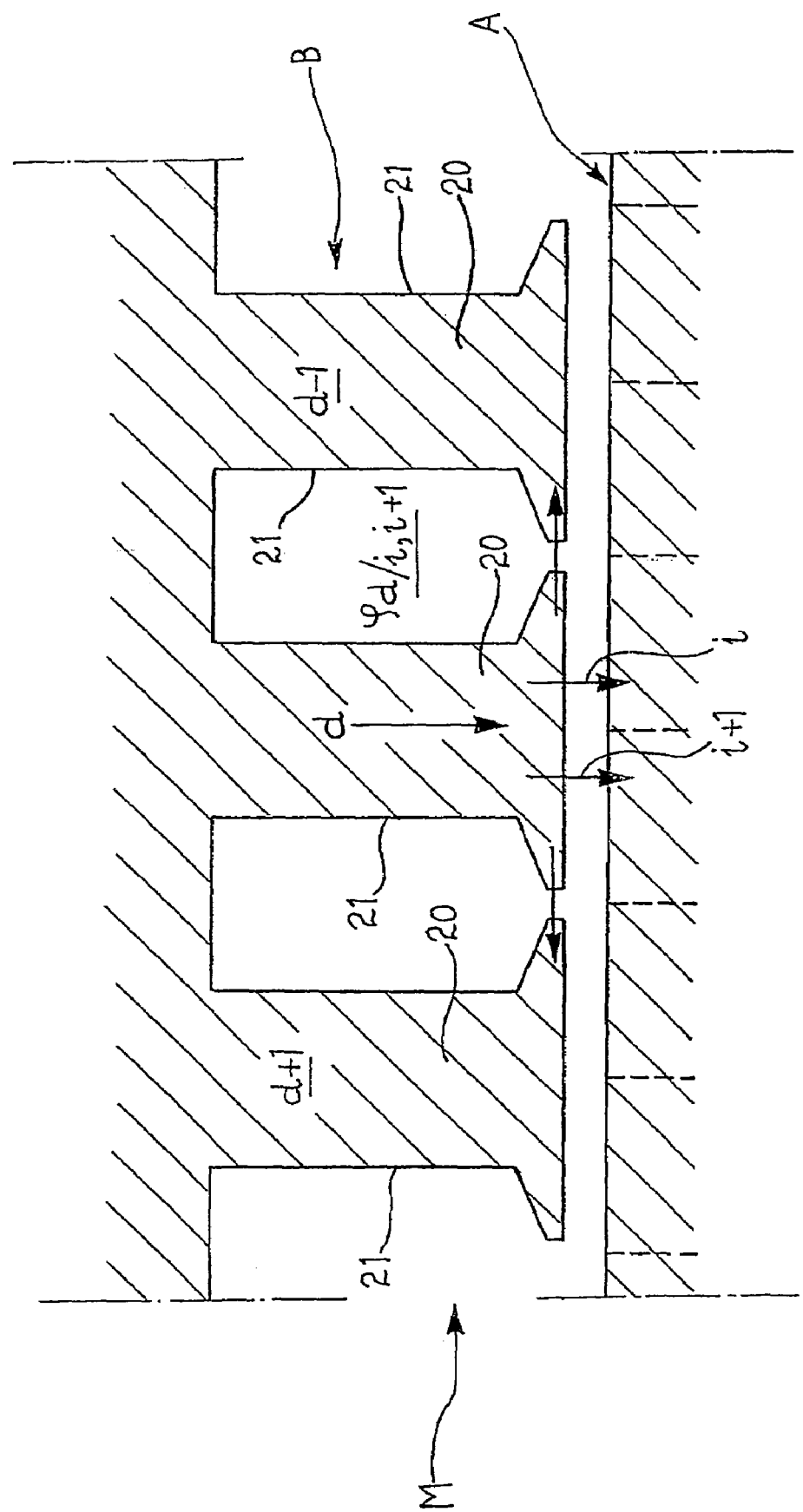

(n=N=3)

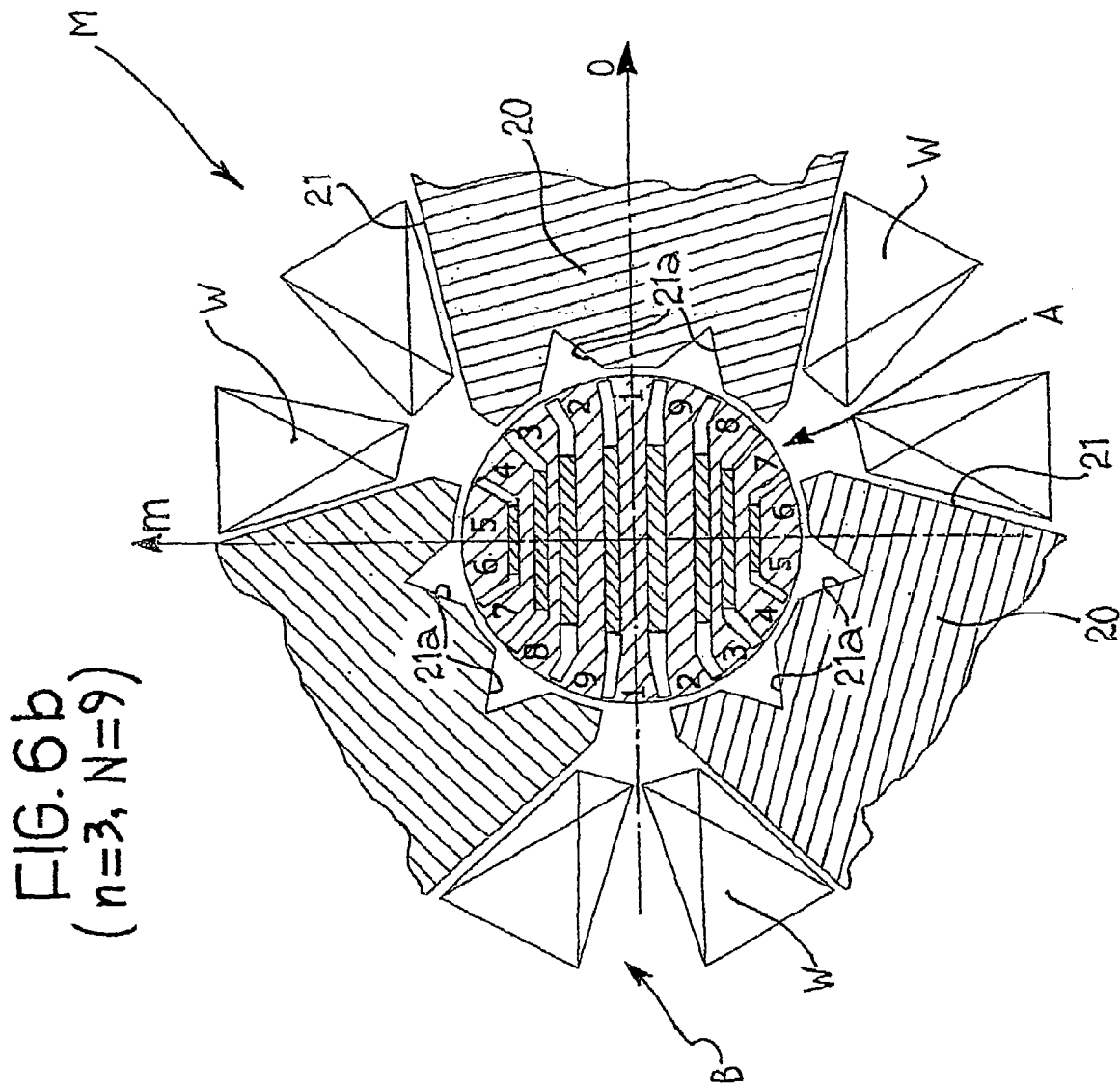

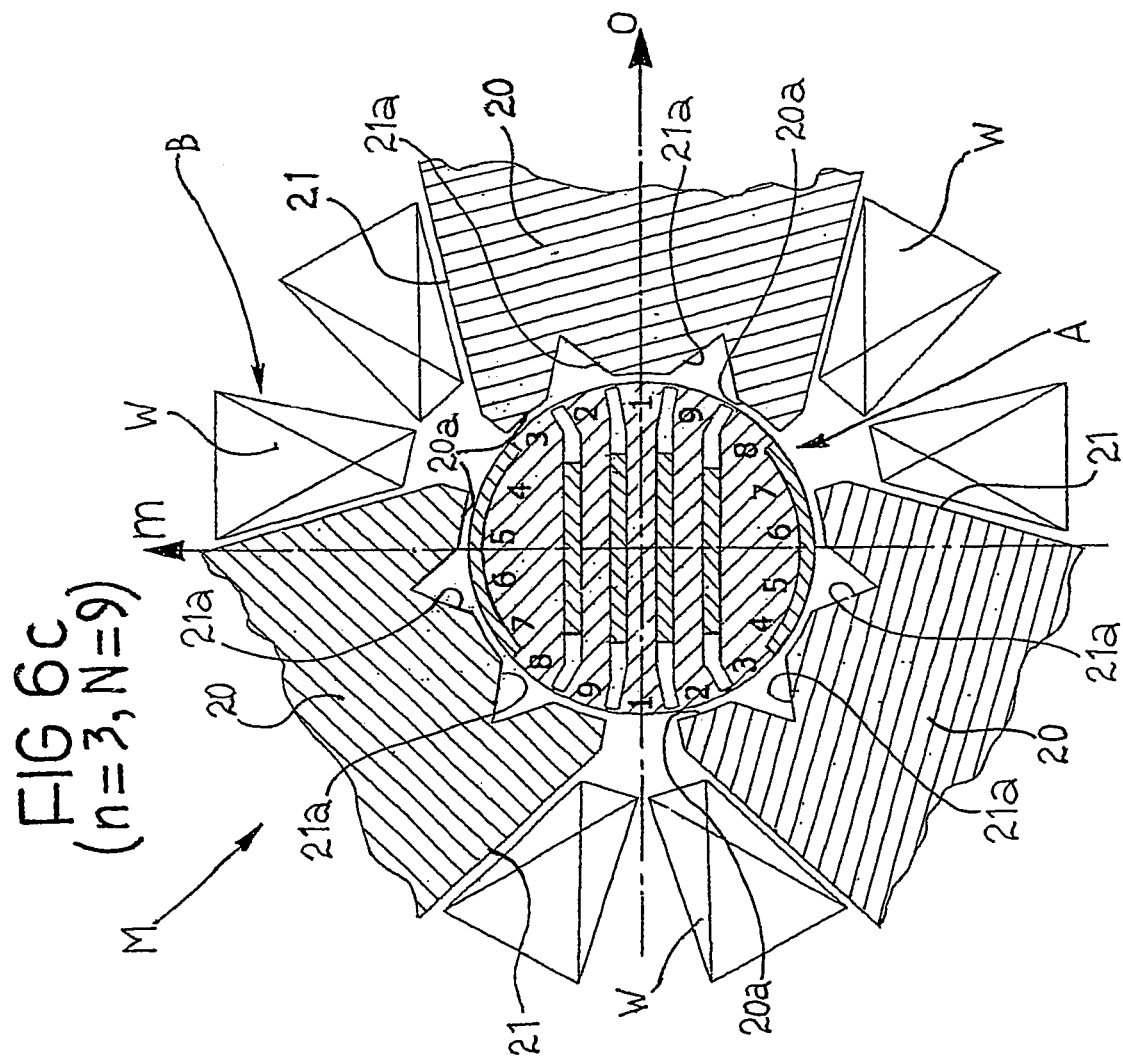

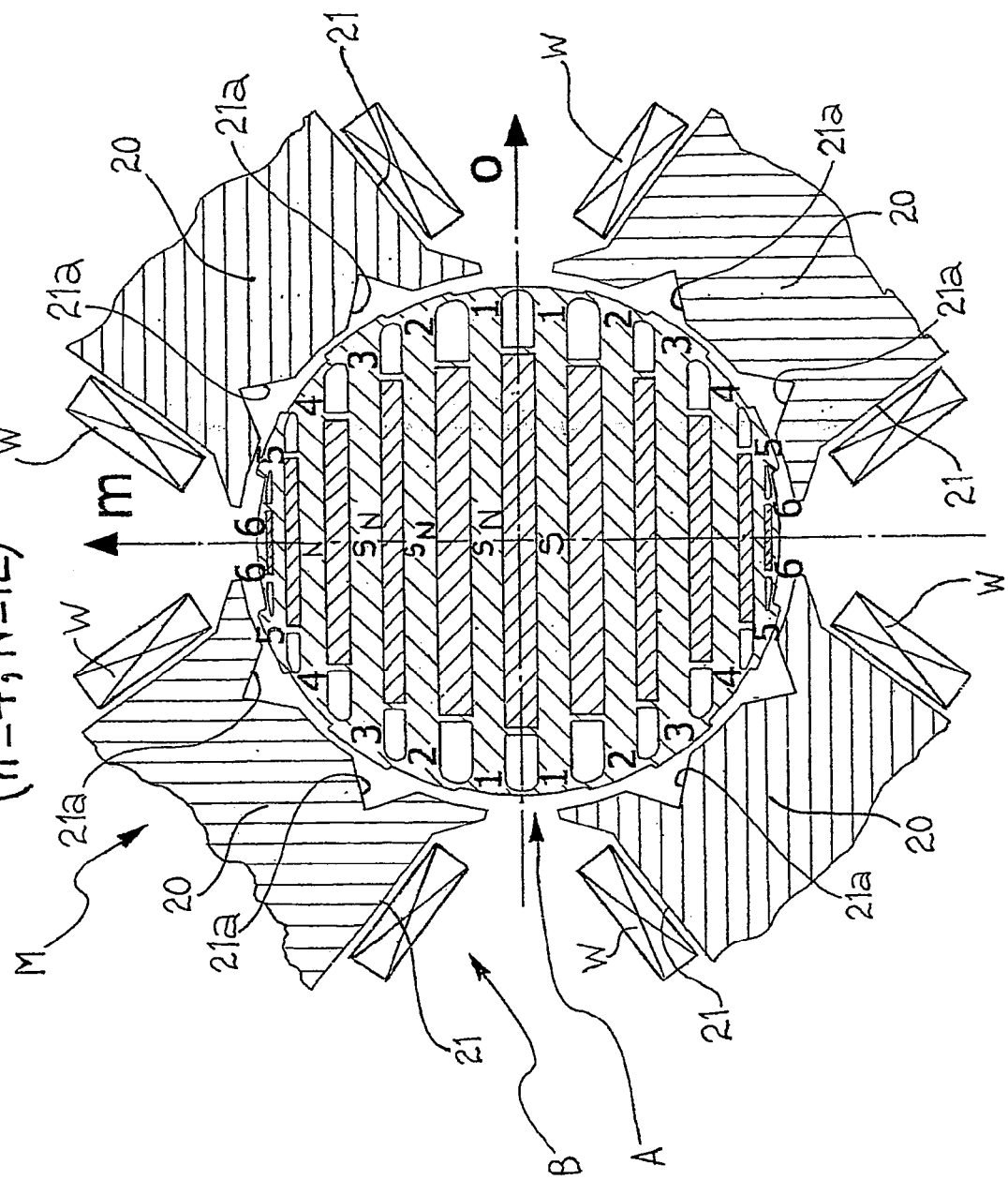

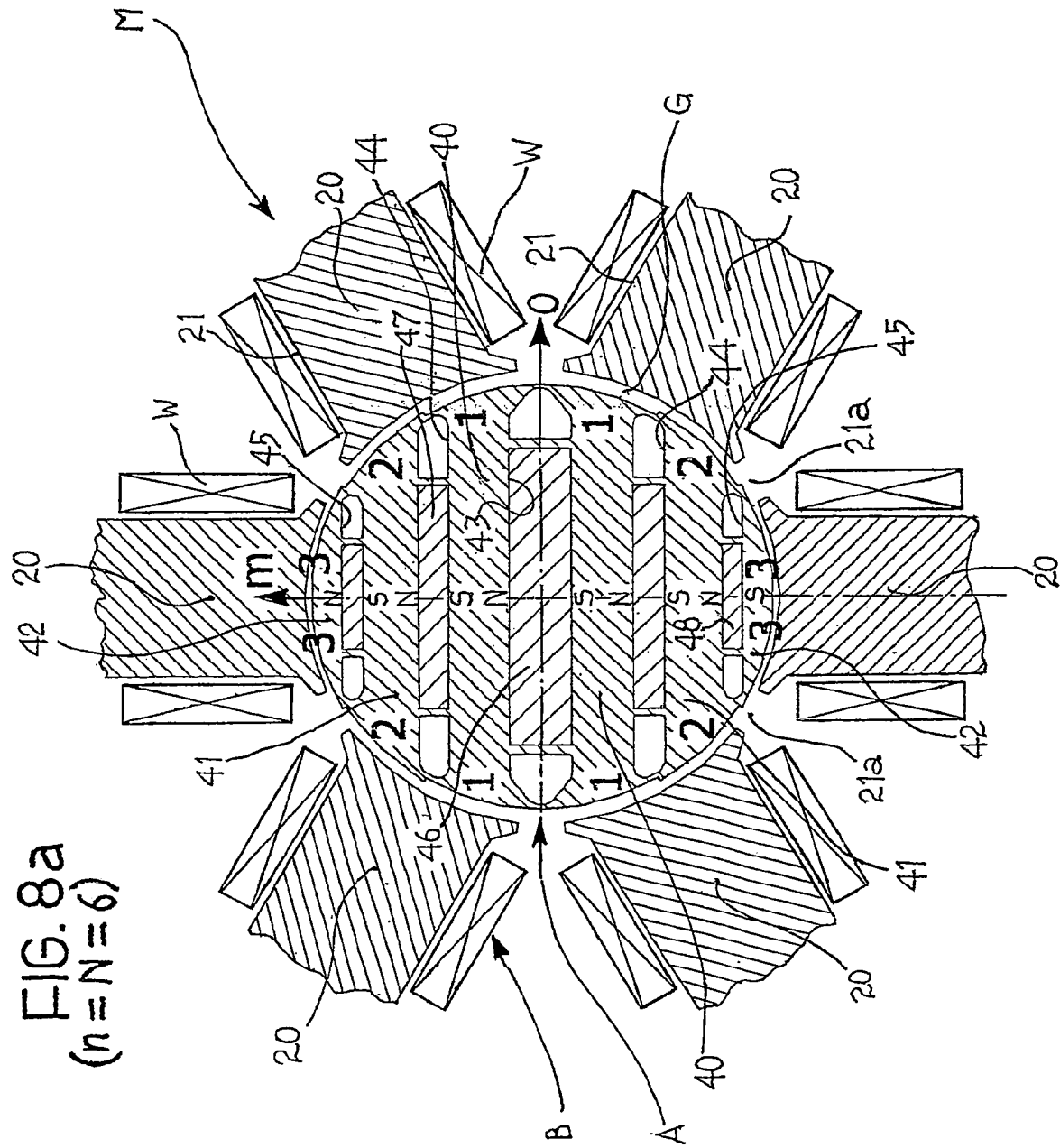
FIG. 8a (n=N=6)

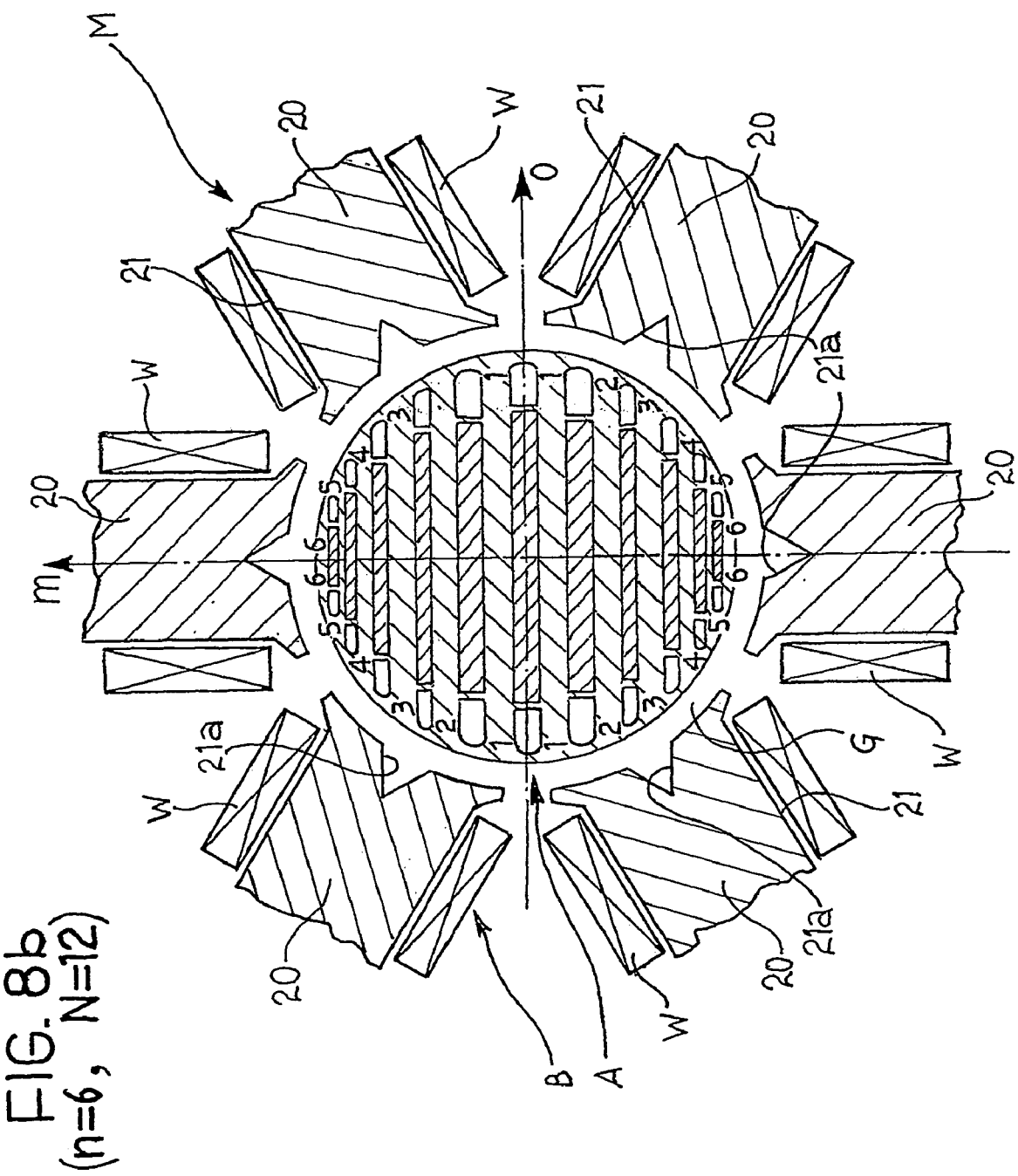

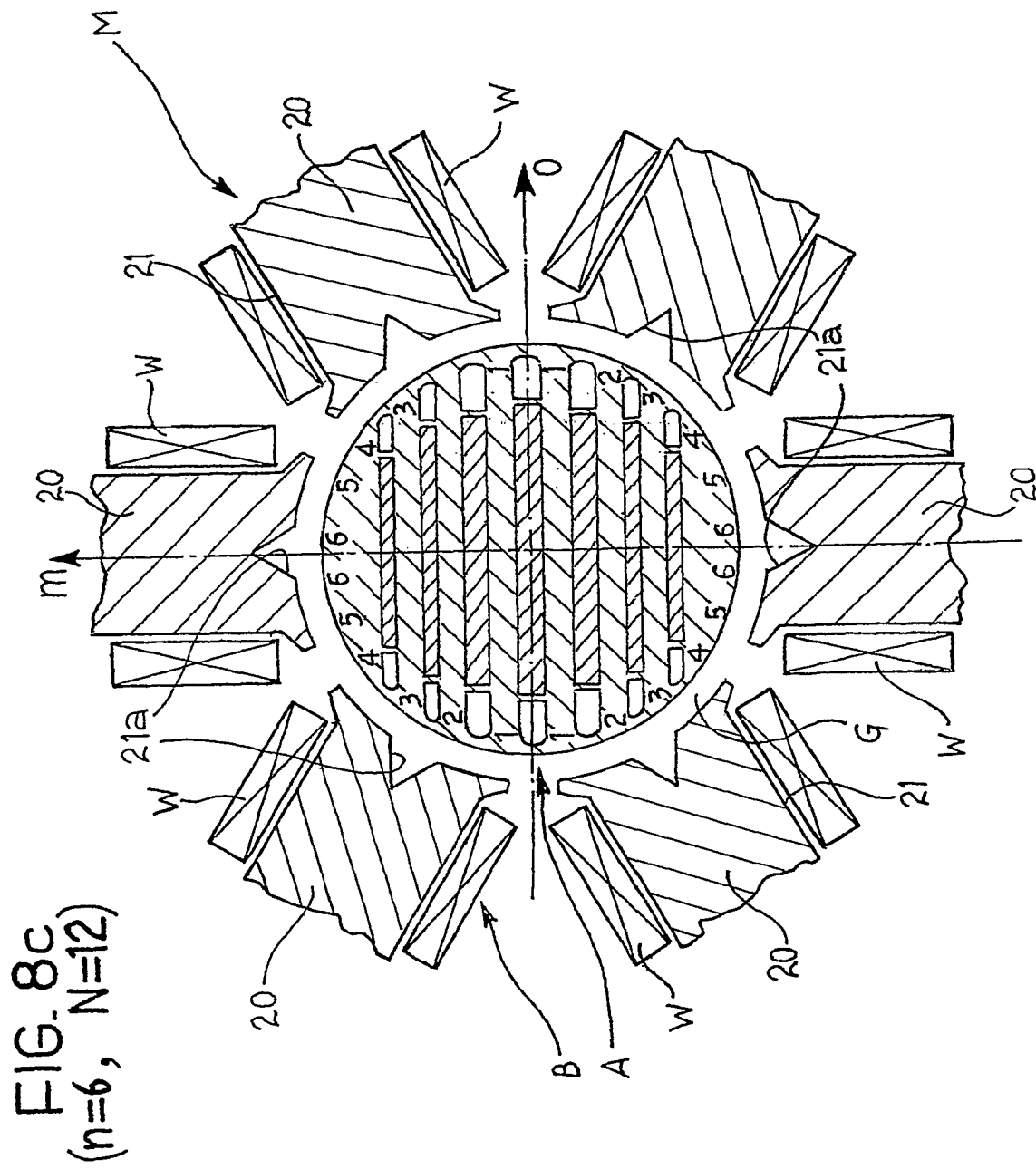
FIG. 8c (n=6, N=12)

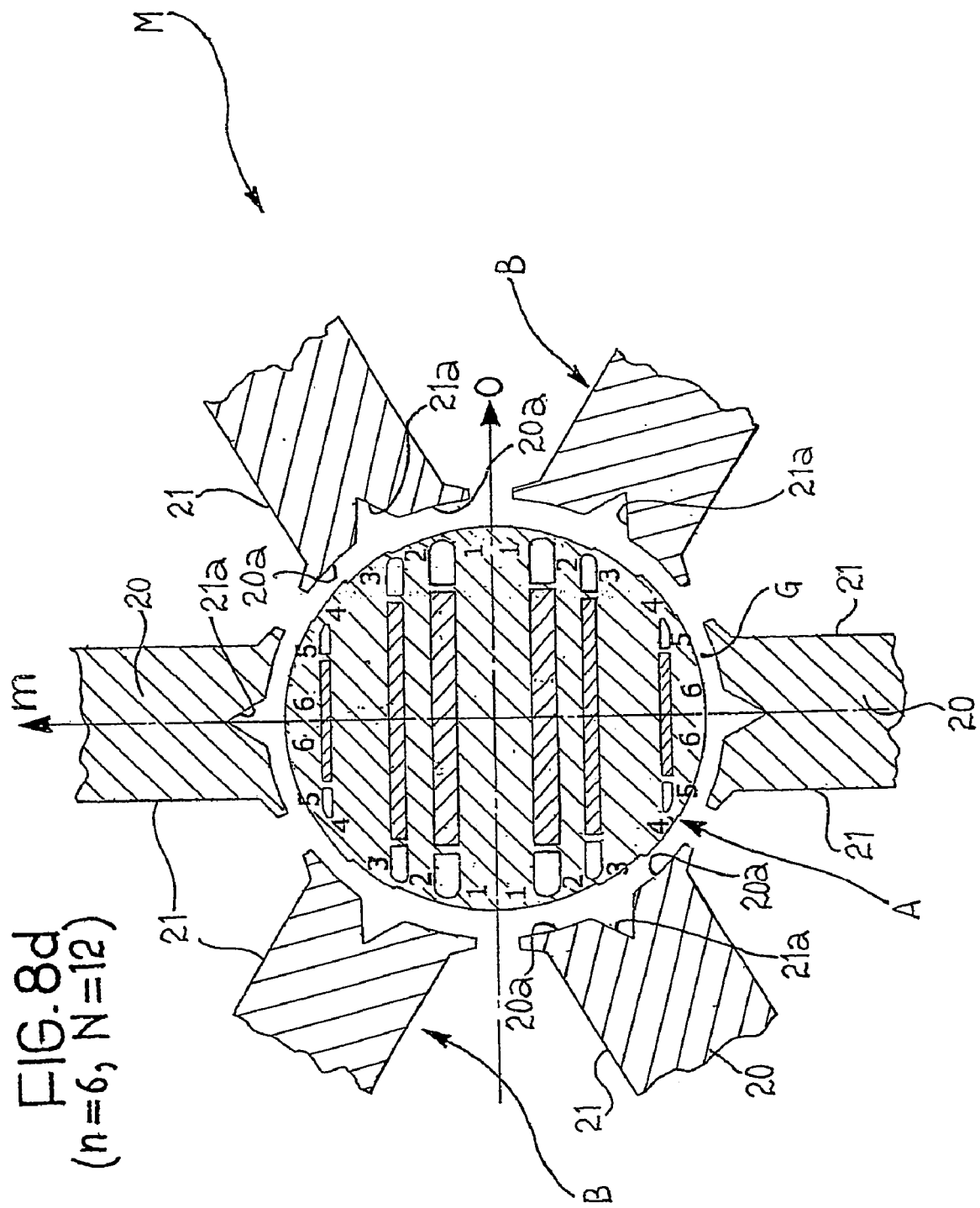

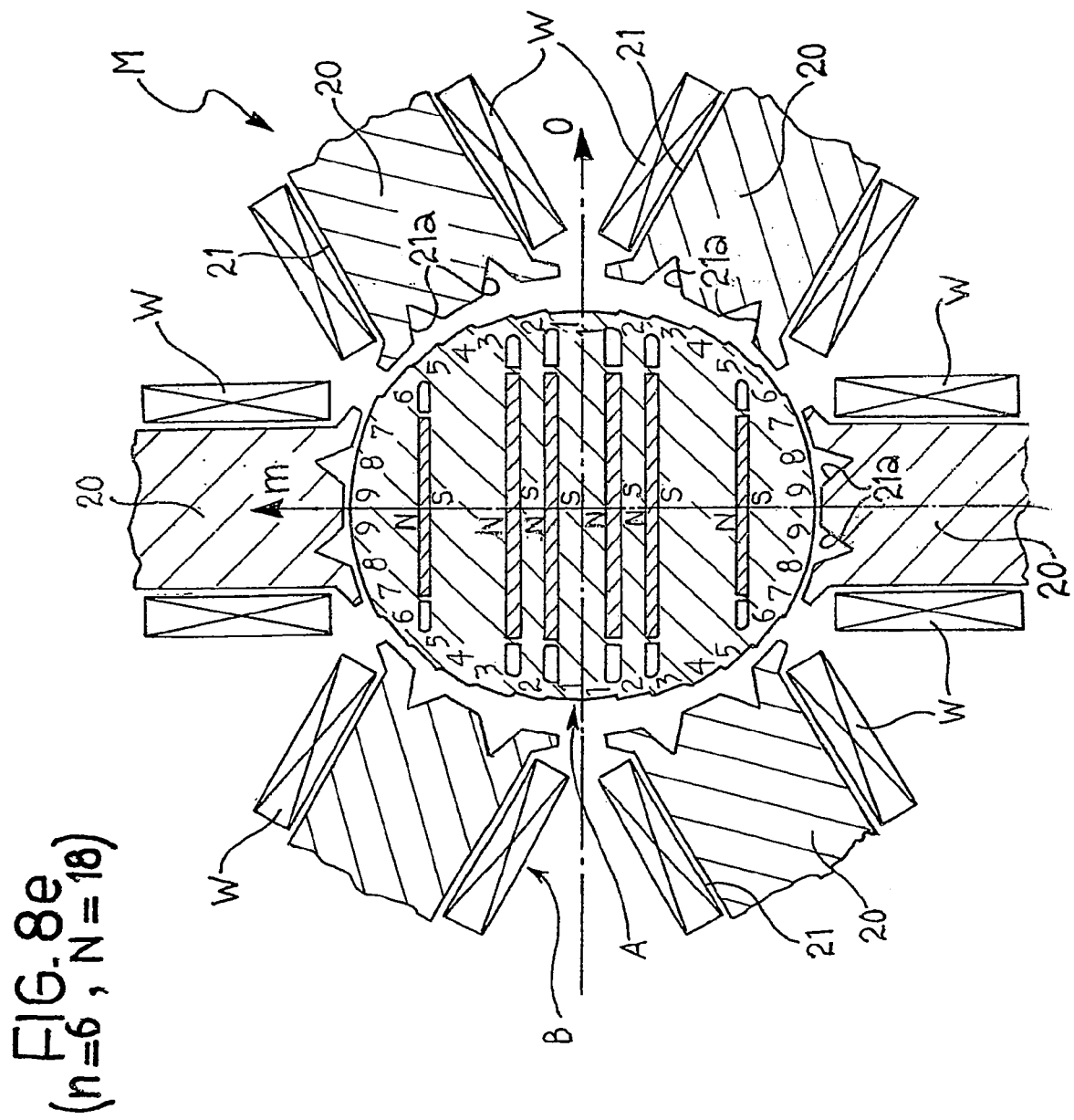

(n = N = 12)

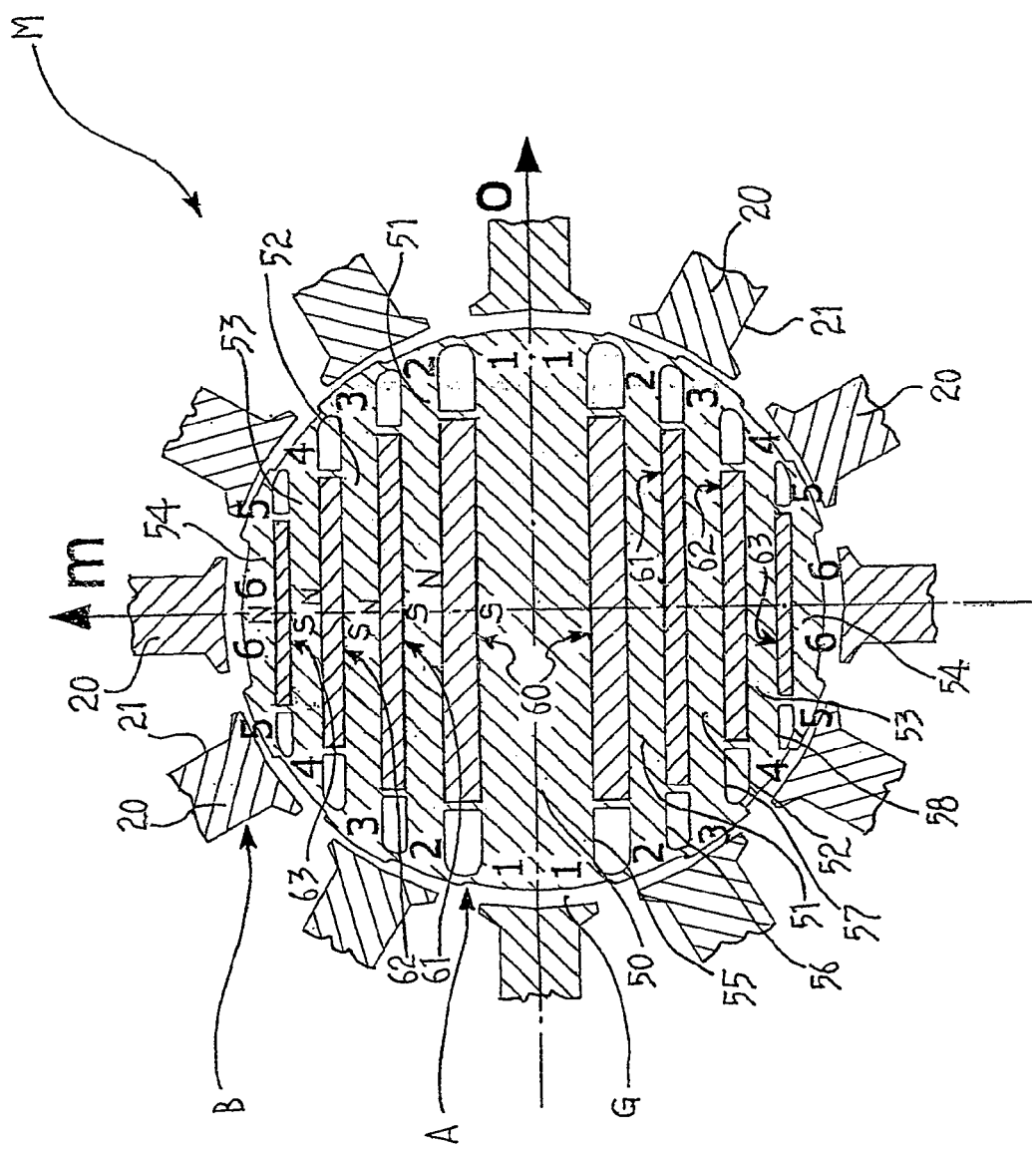

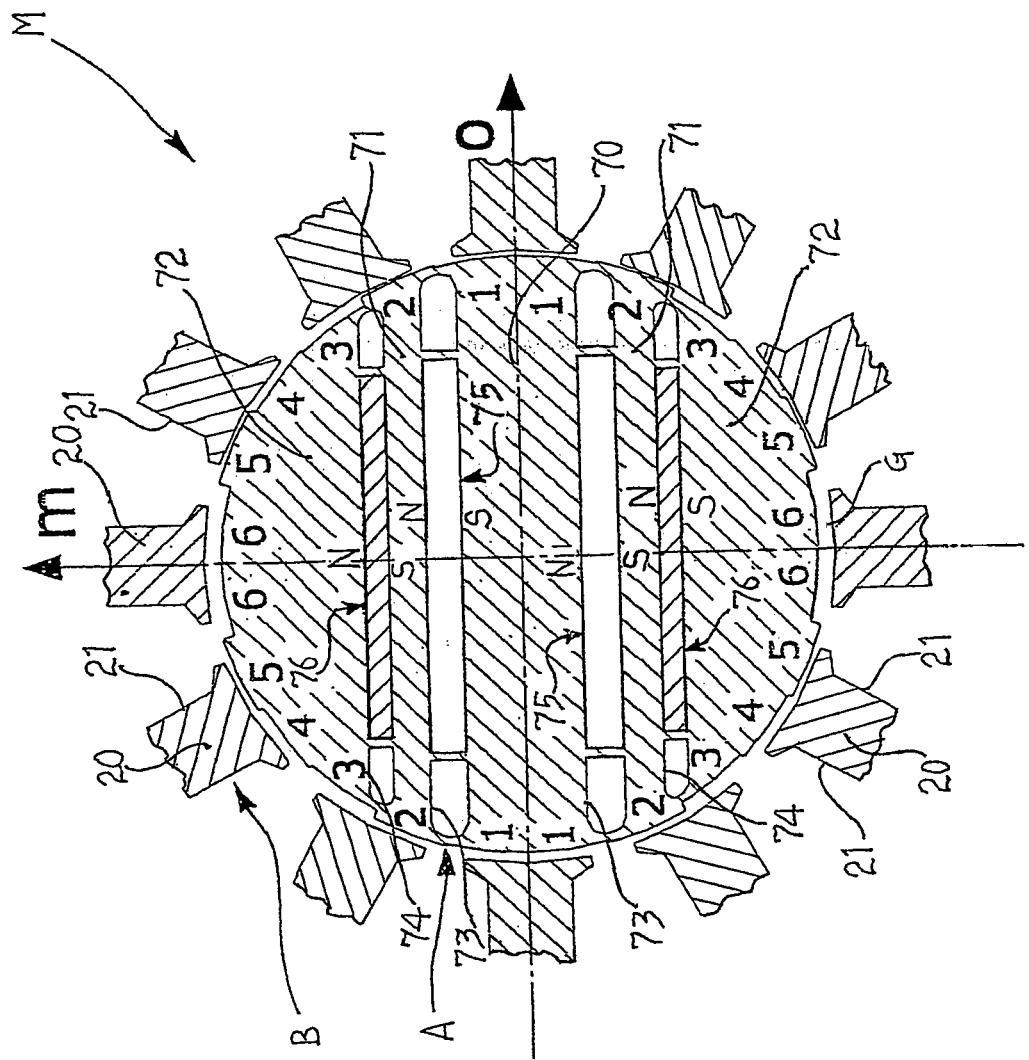

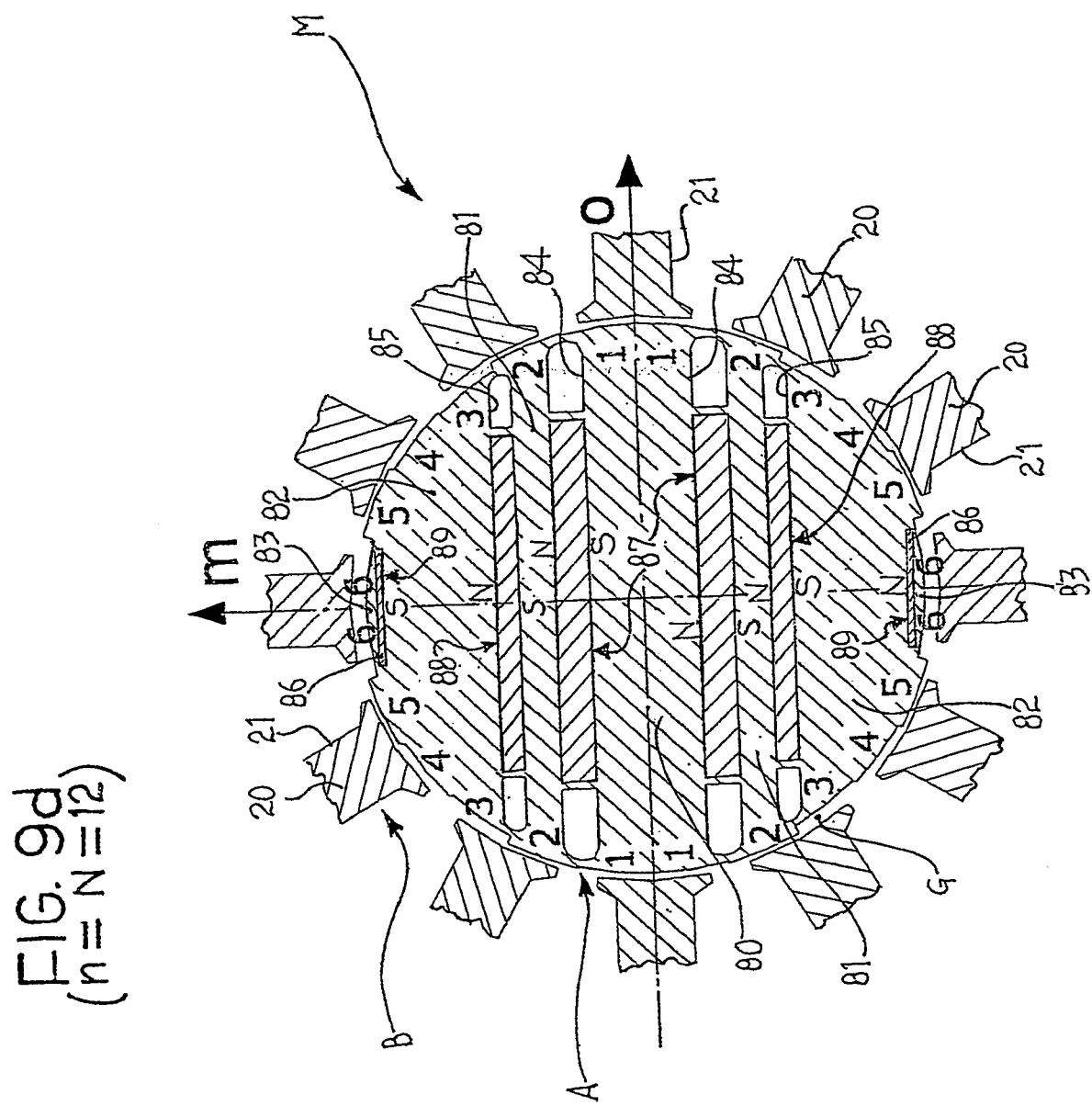
FIG. 9d (n = N = 12)

(n = N = 12)

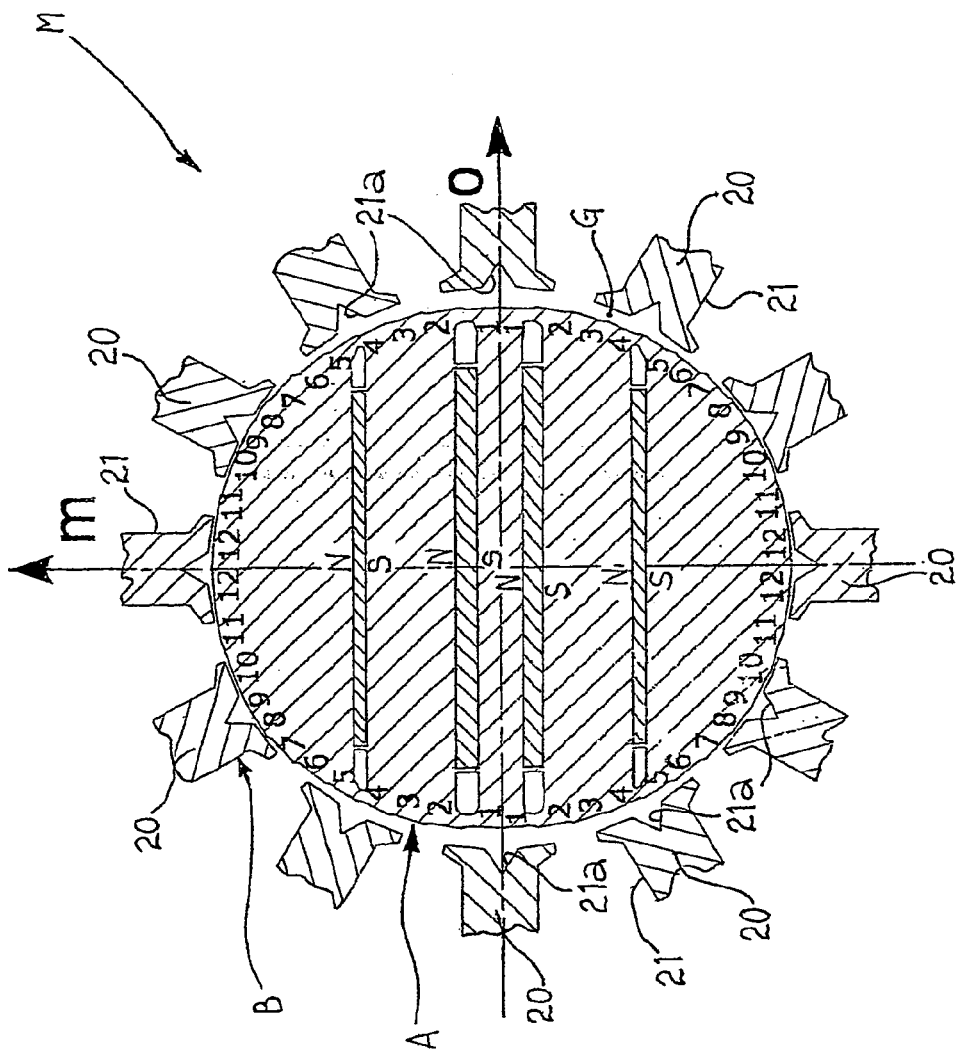
FIG. 9f (n=12, N=24)

(n = N = 12)

(n = N = 12)

SYNCHRONOUS ELECTRICAL MACHINE

This is a National Stage entry of Application PCT/EP2003/009542, with an international filing date of Aug. 28, 2003, which was published under PCT Article 21(2) as WO 2004/02 1550 A3, and the complete disclosure of which is incorporated into this application by reference.

FIELD OF THE INVENTION

The present invention relates in general to synchronous electrical machines.

More specifically, the subject of the invention is a synchronous electrical machine comprising an armature and an inductor between which is defined an air gap,
- the armature having at least one pair of poles;
- the inductor having, for each pair of poles of the armature, n ferromagnetic inductor structures and n slots alternating with one another and having, at the air gap, a respective essentially constant extent in the direction of relative displacement between the inductor and the armature;
- the inductor being provided with a winding.

OBJECTS AND SUMMARY OF THE INVENTION

One object of the invention is to provide indications able to permit the production of synchronous electrical machines of low weight and high performance, able to allow an optimal compromise between performance or characteristics of quantitative type, such as torque density or maximum obtainable power, and performance or characteristics of qualitative type such as the magnitude of the undulation or ripple of the output characteristic of the machine.

A particular object of the invention is to provide synchronous electrical machines characterised by quantitative performance close to the physical limits, by means of the control of the distributions of magnetic field which couple inductor and armature, in particular extending this capacity for control, and therefore of dimensioning, to the region of the maximum torque and/or power values specified for each application.

One object of the invention is in particular to provide indications able to allow the control of qualitative performance of the electrical machine, in particular of the undulations of the values of its parameters such as torque and power produced, which undulations are inevitably associated with the average values produced and which are required for the electromechanical conversion of the energy. In particular an object is that of allowing the division of the period of these undulations to be equal to the number of inductor slots (n).

In summary, the object of the invention is therefore to define an organic concept of synchronous electrical machine capable of identifying the free parameters, that is the degrees of freedom available for dimensioning, as well as the (minimum) properties which these parameters must satisfy, the number of such parameters being high to allow at the same time the control of the quantitative and qualitative aspects of each specific application at the same time.

This and other objects are achieved according to the invention with the synchronous electrical machine the salient characteristics of which are defined in the annexed Claim 1.

DRAWINGS

Further characteristics and advantages of the invention will become apparent from the following detailed description, provided purely by way of non-limitative example, with reference to the attached drawings in which:

FIG. 1a is a partially sectioned view which shows the transverse section of a rotary synchronous electric machine according to the invention with the inductor outside the armature;

FIG. 2a is a partially schematic view which shows a linearly developed portion of the inductor and portion of the armature of a synchronous electric machine, corresponding to one pair of poles of the armature, with two pseudoslots for each ferromagnetic structure of the inductor;

FIGS. 3a, 3b, 3c and 3d are schematic partial representations of portions of the inductor and the armature of a synchronous electric machine, shown in four different relative alignment positions which are significant for the following description;

FIG. 5 is a partial linear representation of a portion of the inductor and a corresponding portion of the armature;

FIG. 7 is a partial view in transverse section of a synchronous machine with n=4 slots and N=12 inductor tooth structures and a symmetrical pair of armature poles;

FIG. 8a is a partially sectioned view of a synchronous electric machine according to the invention with n=N=6 slots and inductor tooth structures and a pair of armature poles;

FIGS. 8b to 8d are partial views in transverse section of other synchronous machines with n=6 slots and N=12 inductor tooth structures and a pair of symmetrical armature poles;

FIG. 8e is a partially sectioned view of a synchronous electric machine according to the invention with n=6 slots and N=18 inductor tooth structures and a pair of armature poles;

FIGS. 9a to 9e are partially sectioned views of synchronous electric machines according to the invention with n=N=12 slots and inductor tooth structures and a pair of armature poles;

FIG. 9f is a partially sectioned view of a synchronous electric machine according to the invention with n=12 slots and N=24 inductor tooth structures and a pair of armature poles;

DESCRIPTION

Figure 1B:
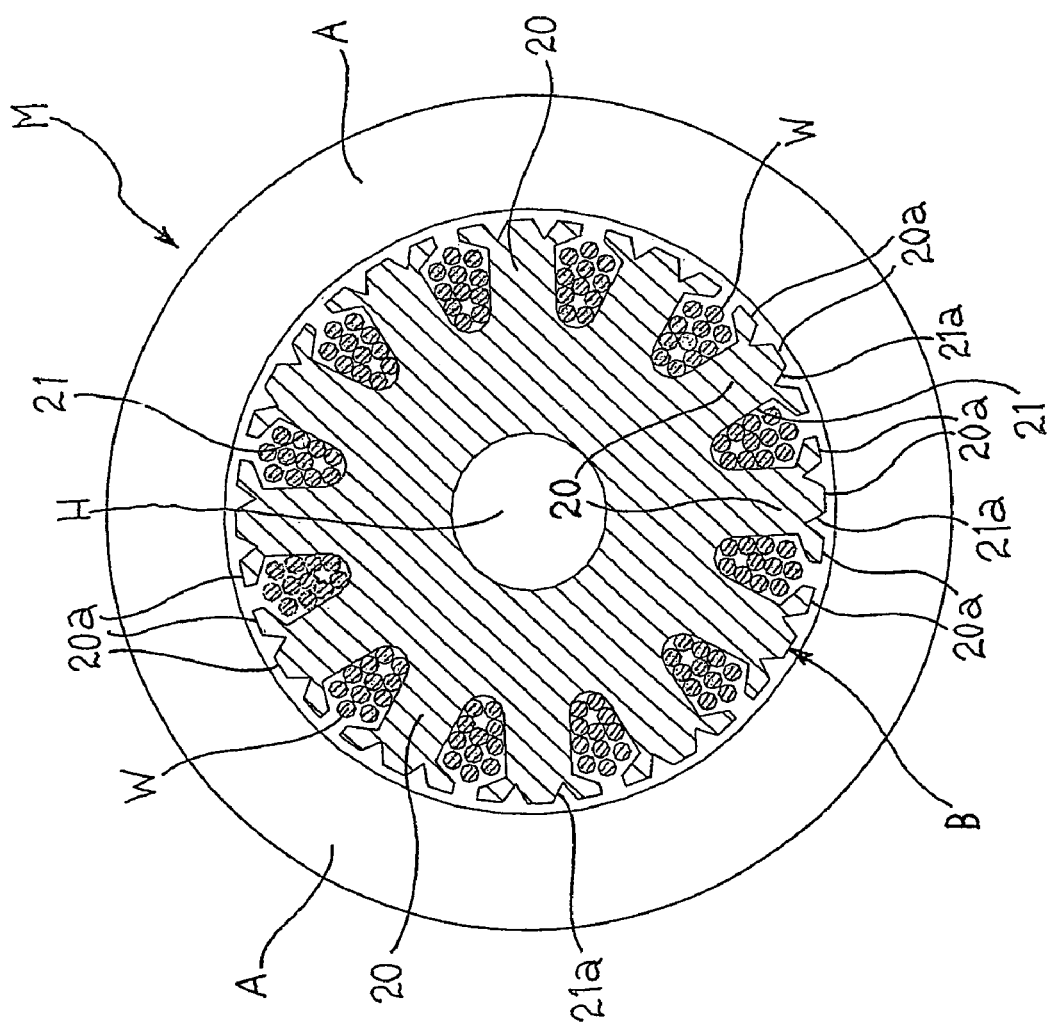
FIG. 1b is a partially sectioned view which shows the transverse section of a rotary synchronous electric machine according to the invention with the inductor inside the armature.

With reference to FIG. 1a, a synchronous electric machine M comprises an armature A fixed to a shaft H and an inductor B.

The armature A has at least one pair of N and S (north and south) magnetic poles.

The inductor B has, for each pair of magnetic poles of the armature A, n ferromagnetic inductor structures 20 and n slots 21 alternating with one another.

Between the inductor B and the armature A is defined an air gap G.

The ferromagnetic structures 20 of the inductor B present to the air gap a sequence of teeth 20a of substantially constant extent along the direction of relative displacement, separated by at least one pseudoslot 21a. The surface of the inductor for each pair of poles presents to the air gap overall N teeth 20a, separated by N intervals 21 or 21a and having substantially the same extent along the said direction of relative displacement. Of the N intervals, n are constituted by the opening to the air gap of the said n slots 21 and (N-n) are constituted by the opening to the air gap of the said pseudoslots 21a. The said pseudoslots 21a are characterised by a width a which is preferably equal to or slightly greater than the width c of the mouths of the slots 21, and by a depth b which is very much greater than the width of the air gap G but in any event strictly less than the depth of a slot 21.

Conveniently, the teeth of the inductor B have at the surface facing the air gap G an extent which, along the said direction of relative displacement, presents a width close to ¾ or ⅞ of the pitch of the teeth or rather of the distance between the axis of one tooth and the axis of an adjacent tooth.

In a manner known per se, the inductor B is provided with a winding W formed by conductors wound and located in the slots 21.

In FIG. 1b is shown the general structure of the synchronous electric machine in which the armature A surrounds the inductor B. In FIG. 1b the parts already described with reference to FIG. 1a have again been allocated the same alphanumeric symbols.

The synchronous electric machine can however be formed (in a manner known per se) with linear inductor and armature.

Armature Sampling

As will become more clearly apparent hereinbelow, a synchronous electric machine according to the invention is characterised in that the surface of the armature A facing the air gap is divided into 2N elements or samples having substantially the same angular extent, that is—more generally—the same extent in the direction of relative displacement between inductor and armature.

In FIG. 1a and 2a the reference letters o and m indicate two transverse axes of the machine; the axis o is the pole separation axis of the armature A whilst the axis m is an axis at right angles to the axis o, that is (in the case of armatures with symmetric poles) the axis of symmetry of the armature poles.

Figure 2B:
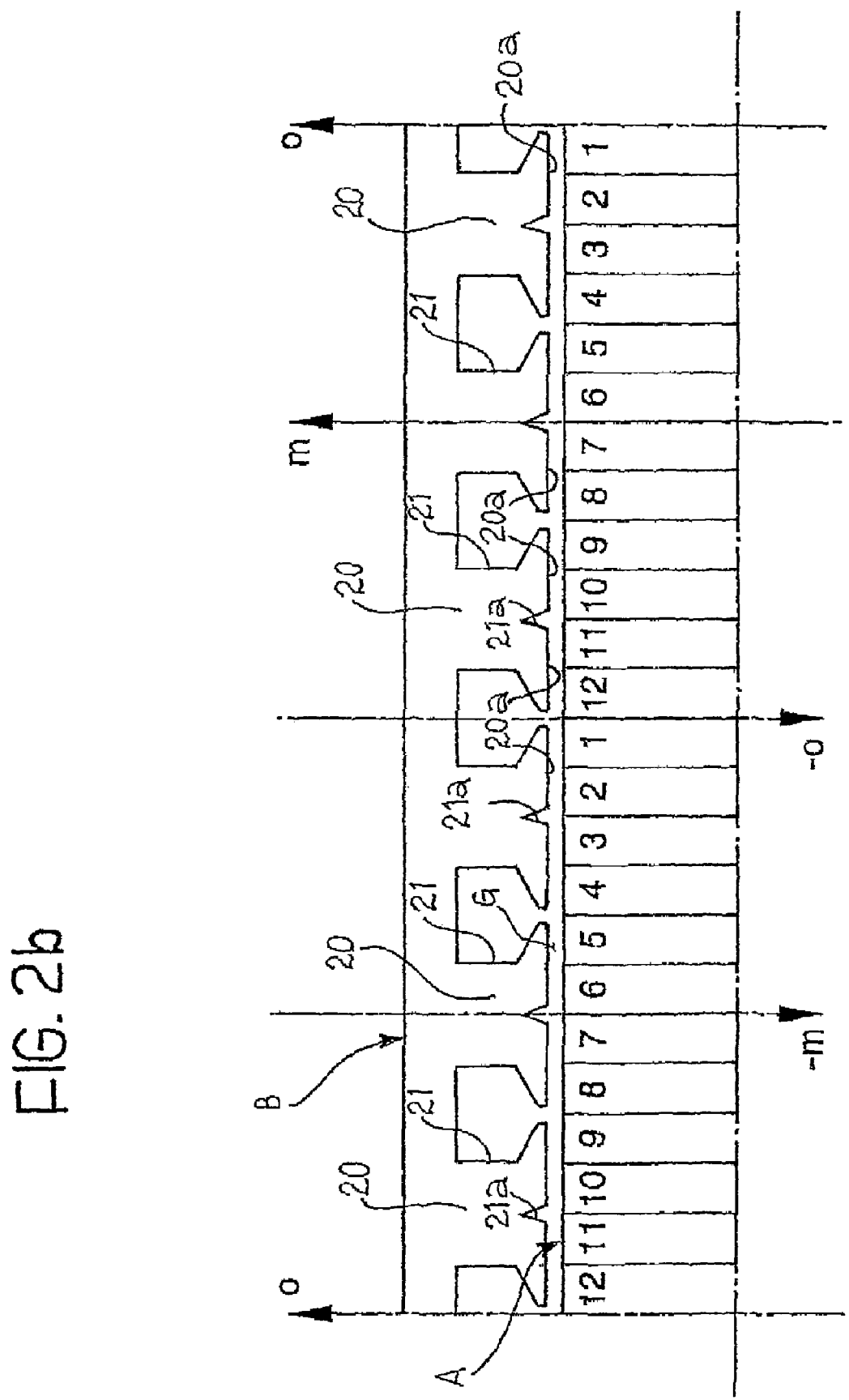
FIG. 2b is a partial schematic view which shows a linearly developed portion of the inductor and portion of the armature of a synchronous electric machine, corresponding to a pair of poles of the armature, with a pseudoslot for each ferromagnetic structure of the inductor.

In FIGS. 2a and 2b the inductor B and the armature A of the synchronous electric machine M of FIG. 1a are shown linearly developed. The inductor in the example of FIG. 2a presents n=3 slots 21 alternating with n=3 ferromagnetic structures each of which has two pseudoslots 21a. Overall the inductor of FIG. 2a has N=9 teeth 20a alternating with N=9 spaces 21, 21a. Correspondingly, as indicated above, the surface of the armature A facing the air gap G is divided into two groups of N=9 elements or samples, identified in each group with the numerals 1 to 9 proceeding from the axis o towards the left as seen in FIG. 2a.

Each element or sample of the armature A has a respective value of magnetic potential or magnetomotive force $\tau_j$ (with j varying from 1 to N=9 in FIG. 2a) which is essentially constant over the extent of the sample in the direction of relative movement between inductor and armature.

Each armature sample is, moreover, associated with a respective total value $p_i$ of magnetic permeance at the air gap G in a predetermined alignment condition or relative position between the inductor B and armature A.

FIG. 2b shows the linearised structure of a machine similar to that of FIG. 2a, but with n=6 slots 21, alternating with n=6 ferromagnetic structures each of which has one pseudoslot 21a. Overall the inductor of FIG. 2b has N=12 teeth 20a alternating with N=12 spaces 21, 21a.

Reference Alignment Conditions

In general in a machine with N teeth 20a, n slots 21, (N-n) pseudoslots 21a and 2N samples per pair of armature poles there exists 2N alignment conditions or reference relative positions between the inductor B and the armature A, useful for the considerations which will be developed hereinafter.

With reference to FIG. 3a, 3b, 3c, 3d there will now be defined the four particular alignment conditions or reference relative positions between the inductor B and the armature A for the case illustrated of a machine with N/n=2. These positions are all that are necessary and sufficient for the design of all the characteristics of an electric machine conceived according to the invention.

Figure 3A:
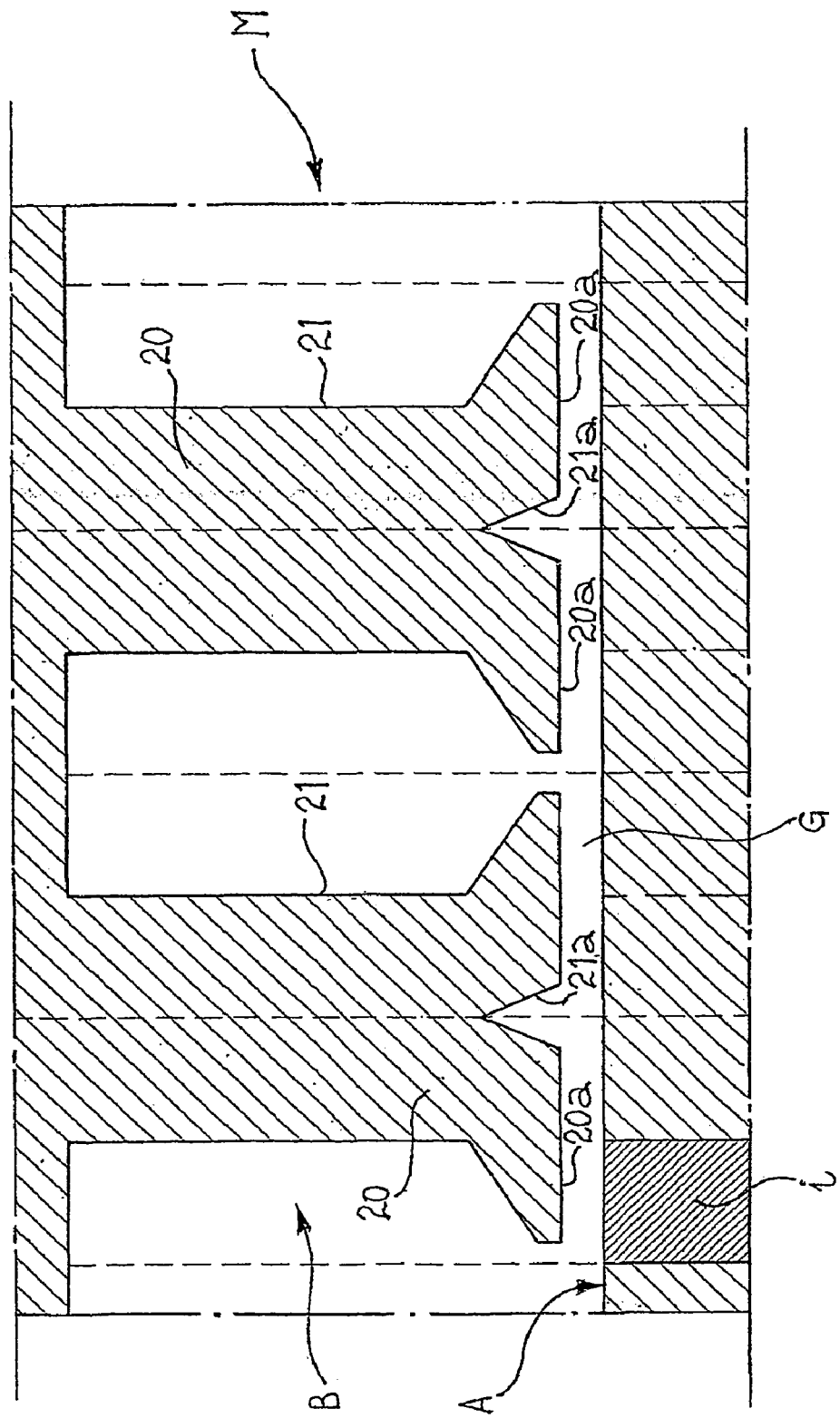

With reference to FIG. 3a, and proceeding for example from left to right, starting from any slot axis, a first alignment condition or relative position of a general sample i of the armature A is that in which the sample extends between this slot axis and the axis of the first tooth to the right with respect to the said slot axis.

Figure 3B:
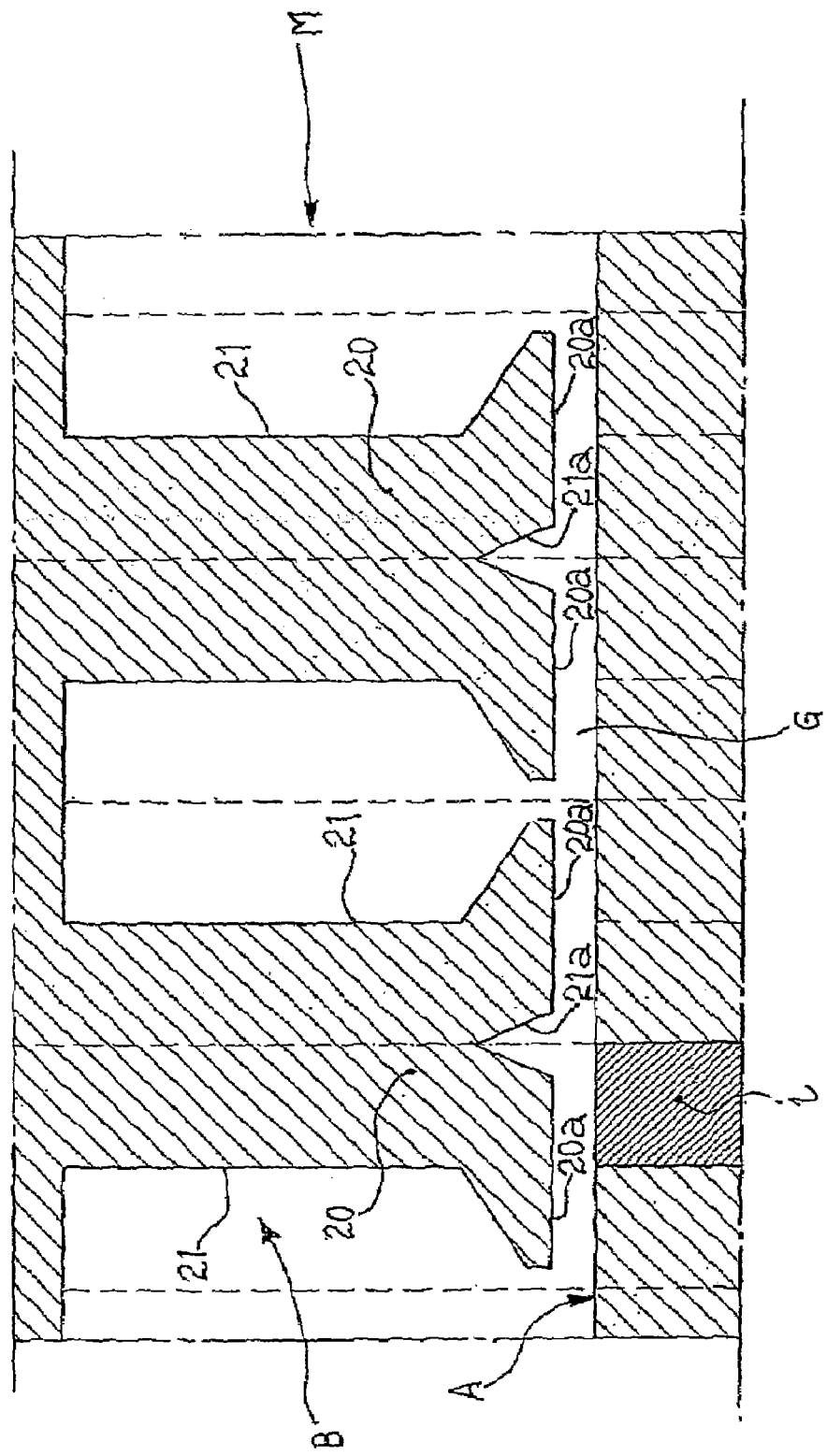

FIG. 3b shows a second alignment condition or reference relative position in which the general sample i of the armature extends between the axis of the said first tooth and the axis of the first pseudoslot 21a to the right of the said first tooth.

Figure 3C:
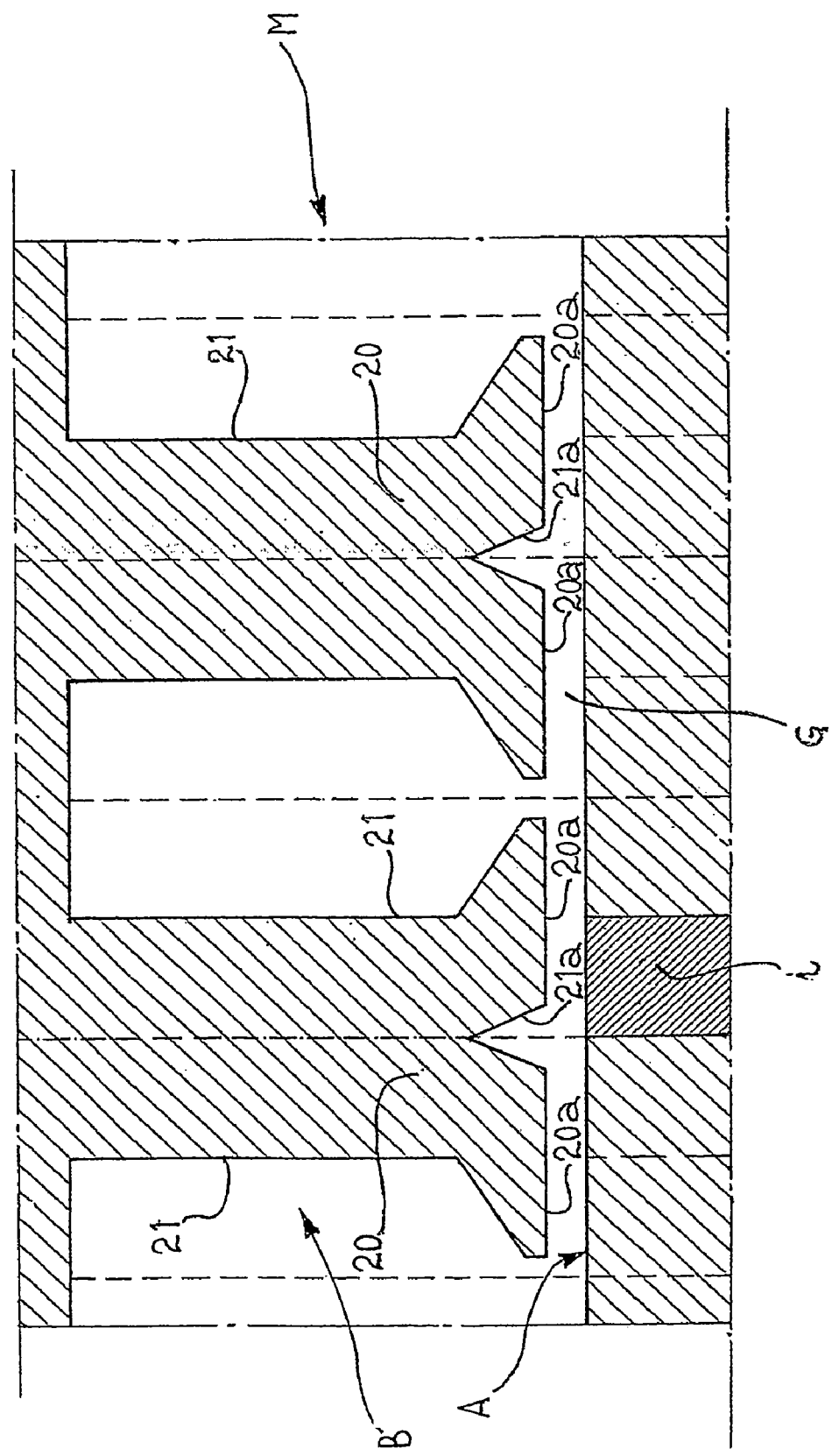

In FIG. 3c is shown a third alignment condition or reference relative position in which the general sample i of the armature A extends between the said first pseudoslot 21a and the axis of the second tooth 20a.

FIG. 3d shows the last and, in this case, fourth particular alignment condition or reference relative position, of a general sample i of the armature A within a slot pitch, in which this sample extends between the axis of the last tooth (that is the second for N/n=2) and the axis of the slot 21 next to the starting slot.

Similarly, in general in the case of N/n=any whole number, there are in one slot-pitch 2N/n different reference alignment positions for the general sample i of the armature A, of which only the first and the last are defined in relation to two consecutive slot axes and all the others 2(N/n−1) are defined in relation to pseudoslot axes.

As already indicated above, in a synchronous electric machine according to the invention each of the 2N samples, per pair of poles, of the armature. A is formed in such a way that it is magnetically coupled with the inductor B through the air gap G by means of a respective total value $p_i$ of the magnetic permeance in each of the above-defined relative position or alignment conditions.

Structure of the Armature

As will become more clearly apparent from the examples which will be described in detail hereinafter, in a synchronous machine M according to the invention the armature A is subdivided into a plurality of layers each of which comprises one or more bodies of ferromagnetic material, magnetically distinct from one another, each of which bodies couples at least two armature samples in such a way as to ensure a substantial magnetic equipotential.

Figure 4:
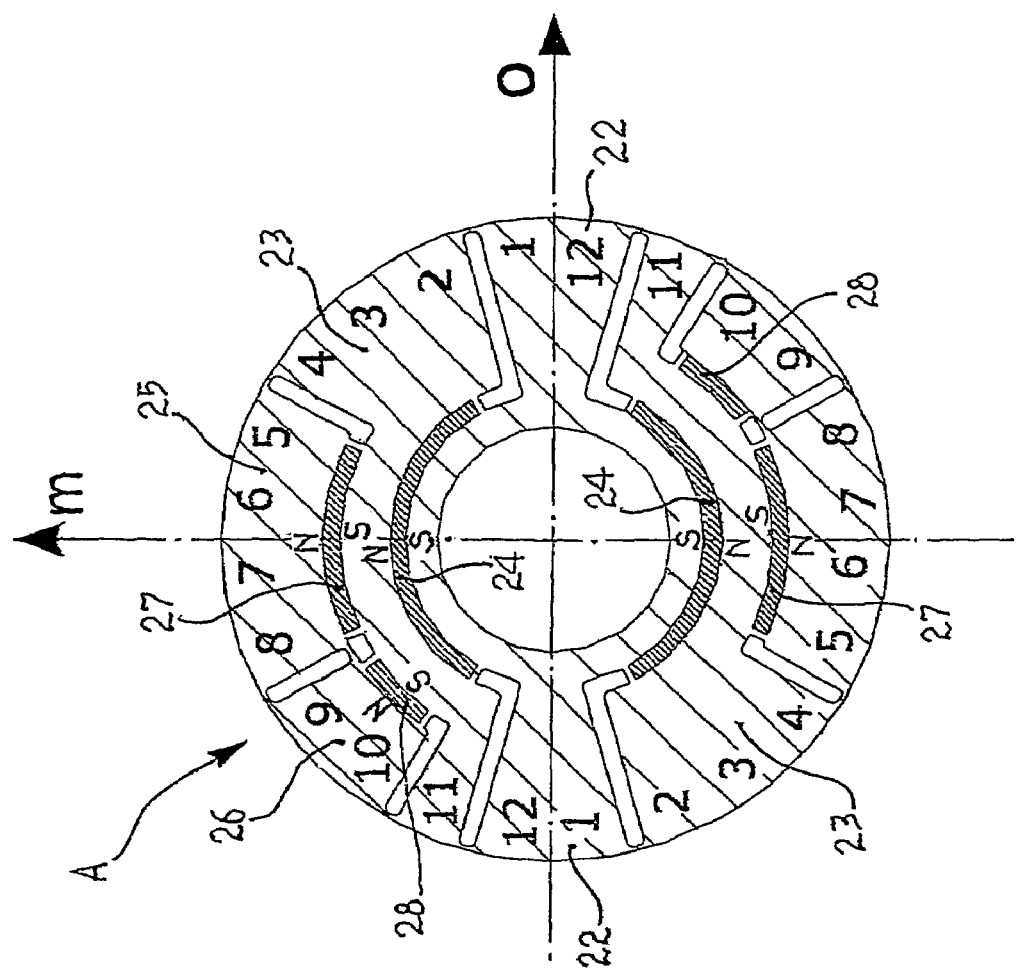
FIG. 4 is a partially sectioned view of an armature of a synchronous electric machine having a division according to the invention into N=12 intervals per pair of armature poles.

In FIG. 4 of the attached drawings there is qualitatively shown the armature of a synchronous electric machine M having layers and armature bodies according to the invention, with armature poles A specularly asymmetric with respect to any axis orthogonal to the air gap, disposed in a symmetrical manner with respect to the centre (that is to the axis of rotation).

In conformity with what has been explained above, the armature A of the machine shown in FIG. 4 has its surface facing the air gap G divided into 2N=24 elements or samples. These samples are divided into two consecutive groups of N=12 samples numbered from 1 to 12.

The armature A comprises a plurality of layers and bodies of ferromagnetic material. A first layer coincides with a body 22 or central body, the opposite ends of which each comprise two armature samples, indicated 1 and 12, spanning the axis o. This body 22 is at zero magnetic potential τ in that it is subjected to opposite magnetic excitations at its ends.

The armature A shown in FIG. 4 further includes two further layers formed by bodies 23 situated on opposite sides with respect to the body 22. The bodies 23 have asymmetric conformation and anti-symmetric relative disposition (in consequence of the symmetry with respect to the centre imposed on such armature). Each body 23 has two non-contiguous sets of contiguous samples facing the air gap G. In particular, in the example illustrated, each body 23 has one end which faces the air gap G with a sample, indicated 11 and the other end which faces the air gap with three samples indicated 2, 3 and 4.

In the spaces defined between the central body 22 and the bodies 23 are disposed respective permanent magnets indicated 24, magnetised in a sense substantially parallel to the axis m, that is to say having the magnetic polarities indicated by the letter N and S.

Moreover, each pole of the armature A shown in FIG. 4 has another layer comprising two bodies of ferromagnetic material, indicated 25 and 26. In the example illustrated in FIG. 4 the bodies 25 have symmetrical geometric disposition with respect to the axis m, facing the air gap G with the four samples indicated 5, 6, 7 and 8. The bodies 26 each face the air gap with two samples indicated 9 and 10 contiguous to the samples of the associated body 25 of the same layer.

Between the bodies 23 and 25 are defined spaces in which are located respective permanent magnets 27. In the spaces defined between bodies 23 and 26 are located other permanent magnets 28.

Internal Magnetic Permeance $P_{gj}$

One series of magnetic parameters of the structure of the armature is constituted by the so-called internal magnetic permeance between different bodies of the armature.

In general, two at least partially adjacent ferromagnetic bodies g and j, are magnetically coupled by the so-called "internal" permeance $P_{gj}$, representative of all and only the magnetic flux exchanged between these bodies within the structure of the armature, that is to say without considering flux lines which in any way intersect the air gap G.

Odd Body

In general, in a synchronous machine according to the invention the armature A must comprise at least one ferromagnetic body which faces the air gap G through two non-contiguous sets of samples, each of which comprises an odd number of contiguous samples. Such a ferromagnetic body will hereinafter be indicated as an "odd body".

It can be seen that the armature of the machine shown by way of example in FIG. 4 satisfies this criterion. In fact, each of the bodies 23 which comprise the samples 11 and the samples 2, 3 and 4, is an "odd body", the part of which facing the air gap G has two non-contiguous sets of samples (11) and (2, 3, 4) each of which comprises an odd number (1 and 3 respectively) of contiguous samples.

Conditions on the Permeance Values Associated with the Samples of Each Body of the Armature In general, in a synchronous electric machine according to the invention, having assigned respective even and odd positions alternately to the armature samples on the surface facing the air gap along the direction of relative displacement between inductor and armature, for each body of the armature having magnetic potential τ substantially different from zero, it is $$\sum_x p_x = \sum_y p_y, \text{ with } x = 2u, y = 2u+1, u = 0, 1, 2, 3\ldots \quad (1)$$

that is the sum of the total magnetic permeances of the samples in even positions is substantially equal to the sum of the total magnetic permeances of the samples in odd positions, for the purpose of minimising the variations in the magnetic energy stored in the machine upon variation of the relative position between the armature A and inductor B, and in particular the variations relating to the excitation produced by the individual permanent magnets inserted in the armature structure.

The Inductor and the Parameters of the Machine

In a synchronous machine according to the invention, the inductor B is conveniently formed in such a way that is able to generate a magneticmotive force distribution which is "seen" by the armature A identically in all relative positions which are spaced from one another by one slot pitch P of the inductor.

Moreover, with reference to the previously-defined alignment conditions, the values of all the magnetic parameters of the electric machine M calculated in the components along two separate axes, for example at right angles to one another, fixed to the armature A, such that the axes o and m, are substantially equal to one another in all the said alignment conditions.

In general, for an electric machine, the following vector relation holds true:

$$\overline{\lambda} = \begin{bmatrix} \lambda_o \\ \lambda_m \end{bmatrix} = \begin{bmatrix} L_o & L_{om} \\ L_{mo} & L_m \end{bmatrix} \begin{bmatrix} i_o \\ i_m \end{bmatrix} + \begin{bmatrix} \psi_o \\ \psi_m \end{bmatrix} \quad (2)$$

in which:
  $\overline{\lambda}$ is the vector of the fluxes linked by the inductor windings;
  $\lambda_o$, $\lambda_m$ are the components of $\overline{\lambda}$ along two axes o and m of the armature, at right angles to one another; the axis o being an axis of separation between the armature poles;
  $L_o$ and $L_m$ are the values of self-inductance measured along the said two axes o and m;
  $L_{mo} = L_{om}$ are the values of mutual coupling between the magnetomotive forces and the fluxes along the said axes o and m;
  $i_o$ and $i_m$ are the components along the axes o and m of the vector representative of the currents flowing in the windings, which produce the overall magnetomotive force generated by the inductor; and
  $\Psi_o$ and $\Psi_m$ are the components of the flux linked by the windings of the inductor along the axes o and m, respectively, for $i_o = i_m = 0$ that is in the absence of excitation of the inductor.

In general, the parameters $L_o$, $L_m$, $L_{om} = L_{mo}$, $\Psi_o$ and $\Psi_m$ vary as a function of the position co-ordinate along the direction of relative movement between the inductor and armature, that is as a function of the angular position co-ordinate in a rotary machine.

These parameters have a respective average value and a respective undulation or ripple.

Invariance of the Machine Parameters in the Reference Positions

A machine according to the invention advantageously allows a minimisation of the ripple in its parameters, achieved through a substantial equalisation of the characteristics of the machine in all the previously defined reference positions. This equalisation is represented by the following conditions:

$$L_{O,k} \cong \text{cost} \quad (3a)$$

$$L_{m,k} \cong \text{cost} \quad (3b)$$

$$L_{om,k} \cong \text{cost} \quad (3c)$$

$$\Psi_{o,k} \cong \text{cost} \quad (3d)$$

$$\Psi_{m,k} \cong \text{cost} \quad (3e)$$

with k=1, 2, . . . 2N/n
in which
  $L_{o,k}$ are the values of self inductance measured, in the said 2N/n alignment conditions, along a first axis (o) corresponding to the axis of separation of the poles (N, S) of the armature (A);
  $L_{m,k}$ are the values of self inductance measured, in the said 2N/n alignment conditions, along a second axis (m) at right angles to the axis (o) of separation of the poles (N, S) of the armature (A);
  $L_{om,k}$ are the values of mutual coupling between magnetomotive forces and fluxes along the said first and second axes (o, m) in the said 2N/n alignment conditions;
  $\Psi_{o,k}$ are the values of flux linked by the windings (W) of the inductor (B) along the said first axis (o) in the said 2N/n alignment conditions; and
  $\Psi_{m,k}$ are the values of flux linked by the windings (W) of the inductor (B) along the said second axis (m) in the said 2N/n alignment condition.

Harmonic and Sub-Harmonic Content of the Ripple

The period of the undulation or ripple of the machine parameters is in general a function of the pitch P of the slots of the inductor B.

In machines with n=3 and n=6 with conventional three phase windings the period of the undulation of the said parameters is exactly equal to the period or pitch P of the inductor slots.

By contrast, in machines with n=12 inductor slots for each pair of armature poles, the undulation of the said parameters has in general also a double period, that is 2P in addition to P.

In general, the substantial cancellation of the ripple component of period 2P of the said parameters in an electric machine can be achieved by adopting one of the following alternative solutions (known per se):
  formation of the inductor with a hexaphase winding, that is to say with a pair of offset diametrical three phase windings and supplied with two sets of three phase currents offset in time;
  adoption of a (suitable) distribution of the conductors of the three phase winding W of the inductor B.

The substantial cancellation of the ripple with period 2P can, however, be conveniently obtained by forming the inductor with slots of differentiated form as will be better described hereinafter.

In general, by providing the synchronous machine according to the invention in such a way that it has all the characteristics defined in Claims 1 to 4, summarised by the system of equations derived from (1) and by imposing the equations (3a÷3e) it is possible to cancel all the first N/n upper harmonics of the slot pitch P which—as known—are those of greatest magnitude and importance.

In particular, with N/n=1 (that is in the absence of pseudoslots) it is possible to cancel the first harmonic.

With N/n=2 it is possible to cancel the first and second harmonic, with N/n=3 it is possible to cancel the first, second and third harmonic and so on.

Provisions for the Further Reduction of Ripple

The first subsequent harmonic, that is (N/n)+1, can be reduced if the armature B is formed (with a technique known per se, called "stepping") in two axial portions offset from one another by a fraction of the slot pitch 20 of the inductor B less than that known and substantially equal to n/4N. According to the invention these two portions of the armature preferably have respective transverse sections different from one another, nevertheless, however, each satisfying all the conditions defined in the preceding sections. Moreover, these armature portions have possible respective different dimensions from one another along the axis orthogonal to the direction of relative displacement between inductor and armature.

The next harmonic (N/n)+2, can be substantially reduced to zero with suitable width of the opening or mouth 21*b* of the slots 21 and the pseudoslots 21*a* of the inductor B. In particular, it is convenient if the said openings or mouths should have, in the direction of relative displacement between inductor and armature, a width close to ¼ or, preferably, for the reduction of the other harmonics, close to ⅛ of the pitch P*n/N of the teeth 20*a* of the inductor.

The harmonic (N/n)+3, like the harmonic (N/n)+1, can be minimised by forming the armature A in such a way that it has four axial portions offset from one another by a fraction of the slot pitch P of the inductor B less than that known and substantially equal to n/8N of the slot pitch P of the inductor, with a maximum value of 3n/8N offset between the outer portions of the armature. These portions, whether of the same transverse sections and dimensions or (possibly) different from one another must, however, nevertheless, each satisfy all the conditions defined in the preceding sections.

The sequence of provisions described above progressively reduces the magnitude of the undulation of torque which is encountered in electrical machines upon variation in the relative position of the armature A and inductor B, sufficient to satisfy the most stringent requirements of high quality applications, maintaining the possibility of controlling the quantitative contribution of each portion of the machine to the total torque by also applying to each portion the criteria for the control of the quantity of magnetic flux in the individual teeth of the inductor, up to the maximum required torque levels, as will appear more clearly hereinafter.

Nevertheless, the known techniques of "skewing" of the armature or inductor are applicable to the machine of the invention.

In this case the invention, however, carries with it the substantial benefit of the cancellation, on the parameters of each section of machine, of the first N/n harmonics, of period P, such that a substantially reduced extent of skewing with respect to the usual amount known in the prior art can be applied and in particular equal to nP/2N.

In this case, too, it is advisable to maintain the cancellation of the harmonic of order (N/n)+2 by the adoption of a suitable slot or pseudoslot mouth as described above. However, by applying "skewing" the maximum offset between machine sections can be increased, thus reducing the possibility of quantitatively controlling the magnetic field in all sections, at least within the region of the maximum torque, at which the phenomena of magnetic saturation become locally manifest.

Conditions on the Distribution of Induction in the Inductor

When designing a synchronous electric machine it is dimensioned in such a way that it is able to deliver a maximum torque $T_M$ and a predetermined maximum power $P_M$. Correspondingly, the armature A of a machine according to the invention is formed in such a way that in operating conditions close to that of maximum power delivery, in all the previously defined alignment conditions, one preferably has that:

a) the distribution of induction in the ferromagnetic tooth structure 20 of inductor B has values substantially close to, preferably less than (for efficiency at high speed) the value of saturation induction of the material of the said ferromagnetic tooth structure 20 over at least ½ but preferably not more than ¾ of the pole pitch of the armature A;

b) this induction distribution is moreover substantially in quadrature with the distribution of magnetic potential generated by the inductor at the teeth 20*a* of the inductor B; and c) the said induction distribution has a variation which increases substantially monotonically for an extent equal to one pole pitch of the armature, and decreases substantially monotonically for the subsequent or preceding pole pitch.

In a real synchronous machine the magnetic flux which flows in one ferromagnetic tooth structure 20 of the inductor B does not comprise only the flux exchanged with the armature through the air gap, but also the flux which is exchanged with the continuous tooth structures (slot dispersion), by the effect of the magnetic permeance existing between these contiguous structures.

In the prior art this flux dispersion represents a limit to the achievement of the maximum theoretical performance: it limits, for example, the possibility of reducing the dimension of the slot opening, by limiting the possibility of obtaining high permeance at the air gap; in each case a high dispersion permeance between the adjacent tooth structures involves, at full load or at high load, the anticipated occurrence of localised magnetic saturation phenomena in those tooth structures of the inductor in which the dispersion flux has the same sign as the flux which traverses the air gap. These phenomena imply large increases in the losses in the ferromagnetic material of the inductor, in particular in the tooth structures, and reduce the torque effectively obtainable for a given current flowing in the inductor windings.

Calculation of Fluxes and Magnitude of the Torque

By way of example, with reference to FIG. 5, in which N/n=1, that is where the tooth structures are free from pseudoslots and support a single tooth, to a first approximation the magnetic flux $\phi_d$, which cuts a general tooth structure d of the inductor B in a general one of the alignment condition defined above in which this tooth structure faces samples i, i+1 of the armature A can be expressed in the following way:

$$\phi_d|_{i,i+1} = (\tau_d - \tau_i)p_i + (\tau_d - \tau_{i+1})p_{i+1} + [(\tau_d - \tau_{d+1}) + (\tau_d - \tau_{d-1})] \cdot P_\sigma \quad (3f)$$

in which $\tau_d$, $\tau_{d-1}$ e $\tau_{d+1}$ are the magnetic potentials of the teeth of the tooth structures d, d−1 and d+1 respectively;

$\tau_i$ and $\tau_{i+1}$ are the magnetic potentials of the samples i and i+1 of the armature A;

$p_i$, $p_{i+1}$ are the total magnetic permeances associated with the samples i and i+1 of the armature A, and $P_\sigma$ is the magnetic dispersion permeance between two tooth structures of the inductor B.

The relation (3f) given above allows the calculation, for each reference alignment condition, of the values of the flux distribution (that is the values of the induction) in the ferromagnetic tooth structures 20 of the inductor B, which values should preferably satisfy the general conditions a), b) and c) set out above.

In a synchronous machine according to the invention the said conditions a), b) and c) can therefore be set to the parameters $\tau_i$, $p_i$ e $P_{gj}$ in such a way as also to compensate the effect of the above-described dispersion fluxes between slots, thus obtaining a further degree of freedom ($P_\sigma$) in the definition of the optimum form of the slots.

The general setting of the equation (3f) is more simply applicable in the conditions of magnetic linearity of the inductor, that is to say when the drop of magnetomotive force in the ferromagnetic circuit of the inductor is substantially negligible with respect to that located at the air gap. This general setting of (3f) however finds full application at full load, especially in cases of incipient magnetic saturation in which the drop of m.m.f which is localised in particular in the ferromagnetic tooth structure cannot be neglected a priori.

Types of Machine

Several details of synchronous electric machines with symmetrical armature and asymmetrical armature will now be considered.

Machines with Symmetrical Armature

By symmetrical armature is meant an armature in which, in transverse section, the poles present a specular symmetry both with respect to each pole separation axis (o) and with respect to each pole axis (m)

In machines according to the invention with symmetrical armatures, whatever the number n of slots and ferromagnetic tooth structures of the conductor, and whatever the number N of teeth at the air gap, the complete system of equations (3a÷3e) apply:

$L_{o,k} \cong cost$ $L_{m,k} \cong cost$ $L_{om,k} \cong cost$ $\Psi_{o,k} \cong cost$ $\Psi_{m,k} \cong cost$ With k=1, 2, . . . 2N/n However, in machines with symmetrical armatures, one finds that, for reasons of symmetry, $L_{om}$ assumes zero values in two of the k=2N/n reference or alignment conditions. Likewise for $\psi_o$, to the extent that for N=n the system of equations (3a÷3e) reduces to only 3a, 3b, 3e.

In general, therefore, the number of equations to satisfy in order to resolve the system of equations (3a÷3e) is equal to 3*(k−1)+2* (k−2).

In general it is possible to define the number of independent parameters which can satisfy the equations (3a÷3e).

By virtue of the of the symmetry of the armature, the number of total magnetic permeances $P_i$ which can be independent from one another reduce from 2N to N/2 when N is even or to (N+1)/2 if N is odd.

The internal magnetic permeances $P_{gj}$ which can be independent from one another are equal to N/2 if N is even or to (N−1)/2 if N is odd.

The magnetic potentials associated with the samples of the armature $\tau_j$, different from zero, which can be independent from one another are equal to N/2 if N is even or (N−1)/2 if N is odd.

Overall, the totality of independent parameters for a machine with symmetrical armature is equal to 3N/2 for machines in which N is even and equal to (3N−1)/2 for machines in which N is odd.

Where the number of independent parameters is greater than the number of equations it is possible to impose on the possibly free parameters the total or partial fulfilment of conditions a), b) and c) indicated above.

Principle of Inverse Distribution of Permeances at the Air Gap Around Axis o

In machines with symmetrical armatures the application of condition a) expressed above, that is to say the condition of "flat" variation of the maximum value of the distribution of induction or flux in the tooth structures, or even the conditions b) and c) correlated to it, implies the necessity of introducing suitable harmonic limits in such distributions, as well as opposing, even cancelling, the phenomenon of so-called armature reaction, in particular correlated with the upper harmonics of the magnetomotive force which excite a flux intensity at the air gap of maximum value in the region of the or each pole separation axis o.

In contrast to what is known from the prior art, according to which the maximum magnetic permeance is located at the axis o, for the purpose of reducing this armature reaction in machines with symmetrical armatures, and to satisfy conditions a), b) and c) expressed above, it is convenient that the distribution of values of magnetic permeance $p_i$ at the air gap G associated with the armature samples has a local minimum for the or each armature pole separation axis o or rather that the values $p_i$ of the magnetic permeance at the air gap increase in both directions starting from the or each armature pole separation axis, this magnetic permeance $p_i$ having its absolute maximum value in correspondence with armature samples lying between the or each said armature pole separation axis and the adjacent axis of symmetry m of the armature poles.

Hereinafter the fulfilment of this principle in the distribution of values of the permeance will generally be referred to as "condition d)".

The position of the said absolute maximum permeance value can, however, be tied to the particular structure of the machine, or it can be optimised on the basis of the overall inductance values $L_o$ and $L_m$ for the specific application, or again can be determined, in a real machine with a finite number N of teeth, in relation to the choice of the number of bodies with which the armature is formed.

Examples of Machines with Symmetrical Armature

Some examples of machines with symmetrical armature will now be considered with reference to specific values of n.

Examples of Machines having Symmetrical Armature with n=3

Figure 6A:
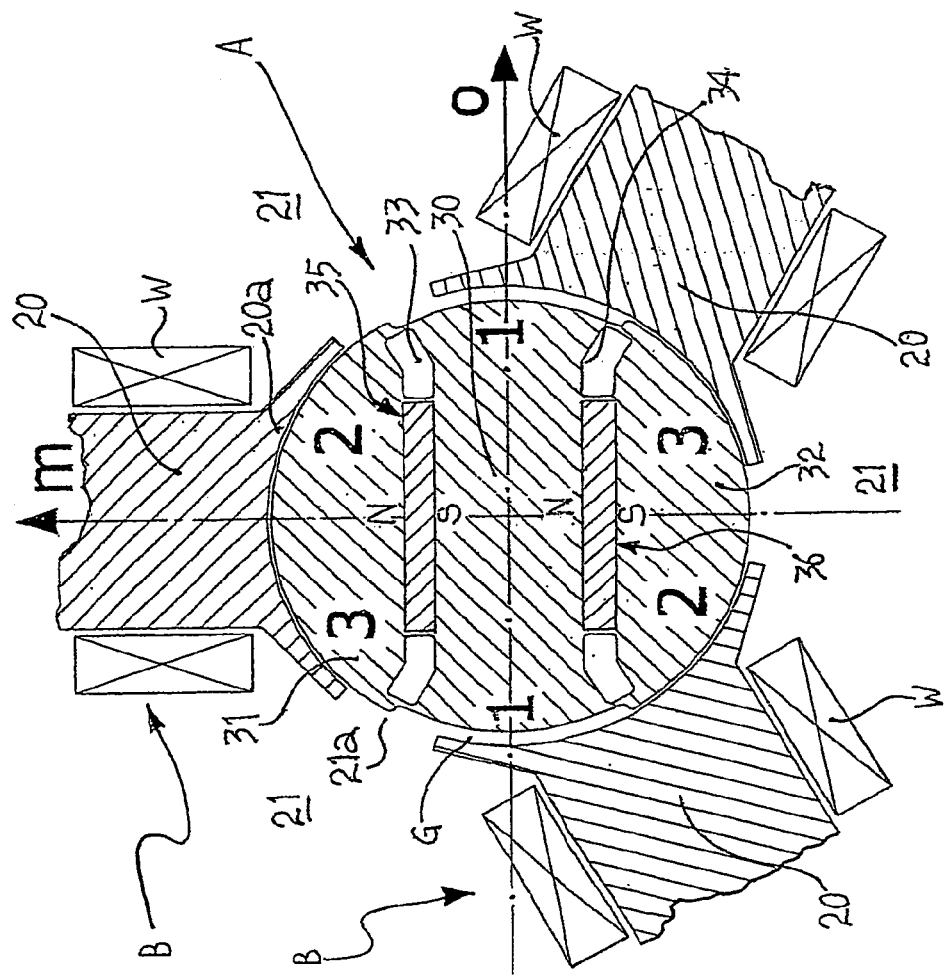
FIG. 6 is a partially sectioned view of a synchronous electric machine according to the invention, with n=N=3 slots and respective inductor tooth structure and a pair of inductor poles.
FIG. 6b is a partially sectioned view of a synchronous electric machine according to the invention, with n=3 slots and N=9 inductor tooth structures and a pair of armature poles.
FIG. 6c is a partially sectioned view of another synchronous electric machine according to the invention, having n=3 slots and N=9 inductor tooth structures and a pair of armature poles.

The simplest possible machine is obtained with n=N=3, such as, for example, shown in FIG. 6a.

The armature A of the machine shown in FIG. 6a has its surface facing the air gap divided into 2N=6 elements or samples. These samples are divided into two groups of N=3 samples, numbered from 1 to 3. The armature A comprises three bodies of ferromagnetic material indicated 30, 31 and 32, separated by spaces 33 and 34 in which are disposed respective permanent magnets 35 and 36 magnetised parallel to the axis m that is to say having the magnetic polarities indicated by the letters N and S.

The central body 30 of the armature A couples together the two armature samples indicated by the numbers 1, and has magnetic potential $\tau_1$=0.

As will be appreciated from FIG. 6a, the air gap G does not in general have a constant radial dimension. The end faces of the teeth 20a of the inductor B lie in fact essentially on the same cylindrical surface. However, the surface of the armature A is not cylindrical in that the individual samples of the armature are associated with respective total magnetic permeances $p_i$ which are in general not equal to one another.

In the specific example of the machine shown in 6a, the magnetic permeance $p_1$ associated with the samples indicated with 1 is less than the magnetic permeances $P_2$ and $P_3$ associated with the samples 2 and 3, which, however, are equal to one another in application of the equation (1). The magnetic permeance associated with the samples 1 is the minimum to satisfy the condition d).

This machine according to the invention has in general good characteristics from the point of view of the reduction of the cogging torque even if it has a high flux ripple in the ferromagnetic bodies of the armature, and a considerable torque ripple. Given the low possibility of controlling the induction in the ferromagnetic tooth structures of the armature upon variation of the relative position of the armature and the inductor, as well as the low utilisation of currents in the windings for the generation of useful magnetomotive force, machines with n=N=3 are not in general considered particularly interesting unless for applications requiring a low torque and with reduced axial length.

For such applications the use of a series of machines having N greater than n becomes more interesting.

The case n=3 and N=6 is not particularly interesting in that the armature structure has no central body at $\tau$ equal to zero.

By contrast, various cases of machines with n=3 and N=9 can have the maximum interest for various applications.

The structure of FIG. 6b makes it possible to achieve the maximum possible levels of torque density with n=3.

The armature A of the machine shown in FIG. 6b has its surface facing the air gap divided into 2N=18 elements or samples. These samples are divided into two groups of N=9 samples, numbered from 1 to 9. The armature A comprises nine bodies of ferromagnetic material separated by eight spaces in which are located respective permanent magnets magnetised parallel to the axis m, that is to say having magnetic polarities indicated by the letters N and S.

The inductor B has three ferromagnetic tooth structures 20 each of which have two pseudoslots 21a.

A structurally simpler case is shown in FIG. 6c and has the particularity of having, for each armature pole, a permanent magnet directly facing the air gap.

This structure in general permits a reduction of the inductance, as well as a good compromise between torque density and defluxability, with a very simplified structure with respect to that shown in FIG. 6b.

The armature A has N=18 samples divided into two groups numbered from 1 to 9.

It is divided into five bodies separated by four spaces in which are located respective permanent magnets. A further pair of permanent magnets faces the air gap spanning the samples numbered from 4 to 7. The inductor B has three tooth structures 20 in each of which are formed two pseudoslots.

Examples of Machines Having Symmetrical Armatures with n=4

The invention also applies to machines having symmetrical armatures with n=4, having windings both of the bi-phase type (diametric) and of tetra-phase type. In general, machines with n=4 find application in small actuators or electromechanical sensors for which as well as the case N=4 and N=8 the case N=12 can be of particular interest as shown in FIG. 7.

The armature A of the machine of FIG. 7 has its surface facing the air gap divided into 2N=24 elements or samples, divided into four groups of six samples numbered from 1 to 6 for reasons of symmetry. The armature A comprises twelve bodies of ferromagnetic material, in equal pairs, separated by 11 spaces in which are disposed respective permanent magnets magnetised parallel to the axis m. These magnets essentially comprise a central magnet and other magnets in equal pairs.

The machine of FIG. 7 does not have a central armature body with $\tau=0$.

The inductor B has n=4 tooth structures each with two pseudoslots.

Examples of Symmetrical Armature Machines with n=6

For three-phase machines the maximum interest can however be excited by solutions in which n=6, which theoretically have the maximum inductor efficiency.

A machine of this type is shown in FIG. 8a, where n=N=6 and the armature poles are necessarily symmetrical, the armature A being divided into the maximum number of layers and bodies according to the invention.

In the machine of FIG. 8a the armature A has its surface facing the air gap divided into 2N=12 elements or samples. These samples are divided into four groups of three samples, numbered from 1 to 3, as a consequence of the application of equation (1). The armature A includes six bodies of ferromagnetic material in equal pairs, indicated 40, 41 and 42. The two bodies 40 adjacent to the axis o are separated by a space 43 in which is indicatively disposed a single large central permanent magnet 46.

Further four permanent magnets, in equal pairs, indicated 47 and 48 are disposed in corresponding spaces 44 and 45 defined between the bodies 40 and 41 and, respectively, between the bodies 41 and 42.

All the permanent magnets are magnetised parallel to the axis m and have the magnetic polarities indicated by the letters N and S.

The surface of the armature A is not (in general) cylindrical, in that the individual samples of the armature are associated with respective total magnetic permeances $p_i$ generally satisfying the relations defined above and specifically condition d).

In particular, however, being a machine of symmetrical type, one equation is indicative for the correlation of the values of the individual total permeances at the air gap:

$$(p_1+p_3)-2p_2=0.$$

For the previously-defined inverse distribution condition, "condition d", the necessity that $p_1<p_2$ is imposed, from which it follows that $p_2<p_3$ by applying the above equation.

To extend the control of the flux distribution up to $\pi/3$ electrical and magnetic radians beyond the axis o, outside the interval between the said axis o and the axis m, within which interval this control is primarily applied, the exact application of condition a) would imply the following ratio between the permeances involved:

$$\frac{p_2}{p_1} = \frac{4}{\sqrt{3}} - 1 \cong 1.31,$$

The third permeance therefore being equal to $$p_3 \cong 1.24\, p_2$$

for which the ratio between the end permeances would be equal to $$\frac{p_3}{p_1} \cong 1.62.$$

In practice, by dimensioning the permeances $p_i$ by applying the condition a) up to the minimum value of extent equal to one half pole, that is to say $\pi/2$, and then applying conditions b) and c), the intermediate permeance $p_2$ being fixed, the following relations are conveniently set:

$$0.763 < \frac{p_1}{p_2} < 1$$

$$1 < \frac{p_3}{p_2} < 1.236.$$

The machine shown in FIG. 8a is that which with n=N=6 has the maximum number of separate armature bodies and can therefore obtain the maximum performance notwithstanding the low number of parameters. However, there is a problem due to the fact that, as can be seen, the armature does not have a central body with $\tau=0$. This can lead to some difficulties in mechanical assembly of the armature. Moreover, all the bodies 40–42 of the armature A face the air gap each in correspondence with a single sample. This leads to a certain induction ripple and corresponding losses in the ferromagnetic material of the armature at high speed.

By contrast, the winding W of inductor B is formed with diametrical turns with theoretical maximum efficiency.

Unfortunately, it is not possible to set all the quality and quantity conditions according to the invention to the machine with n=N=6 and with a central body at $\tau=0$.

To achieve this objective it is necessary to utilise a greater number N of teeth.

In particular with n=6 and N=12 it is possible to increase the availability of independent bodies up to a maximum as is shown in FIG. 8b.

In the machine shown in this figure the armature A is divided into 12 bodies separated by 11 spaces in which are located respective permanent magnets.

The periphery of the armature forms 24 samples divided into four groups numbered from 1 to 6.

The inductor has six tooth structures each of which has a respective pseudoslot.

FIG. 8c shows a machine with n=6 and N=12 with a simplified armature structure in which, in each pole, a single body conveniently includes all the samples from 4 to 6.

In FIG. 8d is shown a different simplification of the armature structure which has the characteristic of presenting a central body of zero magnetic potential which is convenient from a mechanical point of view.

In general, for the armature structures of FIGS. 8c and 8d, which are simplified with respect to that of FIG. 8b, the number of free internal permeances $P_{gj}$ is reduced, such that it is convenient to apply the previously defined condition d) for the purpose of increasing the number of parameters $p_i$ effectively available. In each case it is shown that such total permeance $p_i$ must satisfy at least the simple series of relations set out below:

$$p_1+p_6=p_2+p_5=p_3+p_4$$

This series of equations implies that whenever $p_i \neq$ constant, for the application of condition d) the distribution of $p_i$ must increase monotonically with the subscript i.

In particular, a complete and simplified solution to the equations in the case of the machine of FIG. 8d is obtained by setting:

$p_5=p_6$ for which $p_1=p_2$ and $p_4/p_3=1.215$ from which for exact fulfilment of the conditions from a) to d) inclusive, it is required that:

$p_6/p_1=1.528$ and $p_4/p_1=1.387$

In general, machines with n=6 and N=12 have, with respect to those with n=N=6 a greater torque quality and quantity, as well as a reduced ferromagnetic loss density in the armature bodies.

Machines with n=6 can also be generally convenient in constant power applications, with respect to machines provided with higher n. This is obtainable in particular by setting N=18 as shown in FIG. 8e.

This figure shows the armature divided into seven bodies separated by six spaces in which are disposed respective permanent magnets.

The armature of this machine has a central body at $\tau=0$ which has two samples at its ends.

The bodies immediately adjacent to the central body have a single sample 2 at its ends.

The subsequent intermediate bodies each have at each end three samples and the outermost bodies face the air gap with eight contiguous samples.

In the case of N=18 as well, the condition d) is applied in an analogous manner as explained for cases N=6 and N=12, however with the availability of a greater number of parameters.

Examples of Symmetrical Armature Machines with n=12

Machines according to the invention with n=12 remain of interest in applications in all those cases in which it is desired to minimise the ferromagnetic losses in the armature and in cases in which it is desired to minimise or cancel the quantity of permanent magnets necessary. In fact, for n=12 the magnetomotive force distribution generated by the inductor presents a significantly greater resolution (or rather a decidedly lower harmonic content) than the case with n=6 at the extent that the quality performance required can be obtained with a very much simpler armature structure than those necessary with n=6.

For machines with n=N=12 and with symmetrical armature the system of two equations (3a) and (3b) is transformed into a system comprising a first equation which correlates only the six independent permeances $p_i$, and a second equation which correlates the permeances $p_i$ and the internal permeances $P_{gj}$.

From the first equation it is possible to derive the following simple expression of general validity:

$$(p_1-p_6)-(1+\sqrt{3})(p_2-p_5)+(2+\sqrt{3})(p_3-p_4)=0 \tag{4a}$$

The expression of the second equation depends on the other hand on the number of separate ferromagnetic bodies of which the armature is composed, and therefore on the number of internal permeances $P_{gj}$ present.

Finally, for machines having symmetrical armatures with n=N=12, equation (3e) assumes the following formulation of general validity:

$$(1-\cos\pi/12)b_6 - \tag{4b}$$

$$(\cos\pi/12 - \sqrt{3}/2)b_5 + \left(\frac{\sqrt{3}}{2} - \frac{1}{\sqrt{2}}\right)b_4 - +$$

$$\left(\frac{1}{\sqrt{2}} - \frac{1}{2}\right)b_3 + \left(\frac{1}{2} - \cos 5\pi/12\right)b_2 - (\cos 5\pi/12)b_1 = 0$$

where $b_i = \tau_i \cdot p_i$

The above-indicated equations can thus be re-expressed in a more summarised form:

$$\sum_{i=1}^{6}\left\{(-1)^{i+1}b_{i}\cdot\left[\cos\left(\frac{7-i}{12}\pi\right)-\cos\left(\frac{6-i}{12}\pi\right)\right]\right\}=0 \quad (4c)$$

Figure 9A:
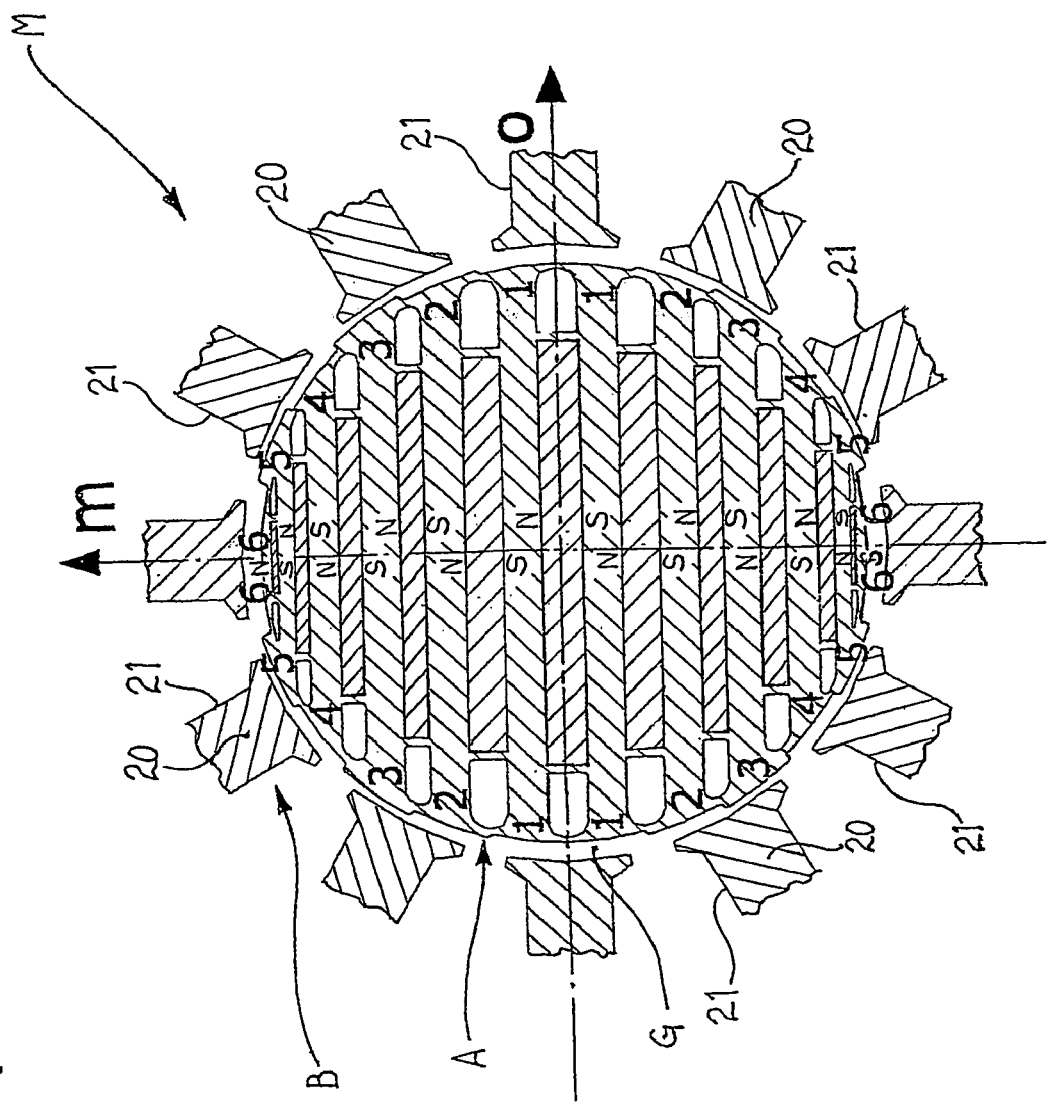

In FIG. 9a is shown an example of a synchronous machine according to the invention having a symmetrical armature, in which for n=N=12 there is a maximum available number of separate armature bodies, and therefore the maximum possible number of separate magnetic potentials and therefore internal magnetic permeances.

The armature A of the machine of FIG. 9a has its surface facing the air gap divided into 2N=24 elements or samples, divided into four groups of six samples numbered from 1 to 6 for reasons of symmetry. The armature A comprises twelve bodies of ferromagnetic material in equal pairs, separated by 11 spaces in which are disposed respective permanent magnets magnetised parallel to the axis m. These magnets essentially comprise a central magnet and other magnets in equal pairs.

The machine of FIG. 9a does not have a central armature body with τ=0, has a high structural complexity and a not negligible induction ripple in the ferromagnetic armature bodies, with consequent losses at high speed.

By contrast, the number of parameters $\tau_j$, $p_i$ and $P_{gj}$ available is rather high, for which it lends itself to the satisfaction of rather disparate functional requirements.

For machines having symmetrical armatures with n=N=12, such as those shown in FIGS. 9a to 9e, the imposition of conditions a) and c) previously described in relation to the tooth structures of the inductor B situated in the region of the axis o of the armature A lead, with reference to the equation (3f) and neglecting $P_o$, to the following condition:

$$\frac{p_1}{p_2} \geq \frac{\cos(\pi/12)}{2-\cos(\pi/12)} \cong 0.93 \quad (5a)$$

For symmetrical armature machines with n=N=12 having a central ferromagnetic armature body with τ=0, such as those shown in FIGS. 9b to 9e, the following further condition is obtained:

$$\frac{|\tau_2|}{\tau_{sp}} \leq \frac{2\sin(\pi/12)}{2-\cos(\pi/12)}\cdot|\sin\gamma| \cong 0.5|\sin\gamma| \quad (5b)$$

where $\tau_{sp}$ is the maximum value of the magnetic potential distribution produced by the inductor B; and γ is the spatial offset between the inductor current vector (that is to say the desired inductor magnetomotive force) and the armature pole separation axis o.

These conditions are associated with the exact application of the previously discussed condition a) and of some simplifying hypotheses.

Even if it is not intended or not necessary exactly to satisfy these conditions it is nevertheless useful to apply the general principle of inverse distribution of permeances expressed by condition d) defined above.

Condition d) in the case in question (n=N=12, FIGS. 9a to 9e) implies at least the following inequality between the first two permeances:

$$p_1 < p_2 \quad (5c)$$

Finally, the following value interval is obtained:

$$0.93 \leq \frac{p_1}{p_2} < 1. \quad (5d)$$

Similarly, the same condition d), extended up to include the third permeance value for all the symmetrical armature machines with n=N=12, in combination with condition a), moreover leads to the imposition of the following inequalities in the ratio between the second and third permeance:

$$0.86 < \frac{p_2}{p_3} < 1 \quad (5e)$$

which add to those above for the definition of machines in general provided with greater defluxability at the cost of torque density.

In machines according to FIG. 9b (synchronous machines with symmetrical armature, with n=N=12) the armature A has its surface facing the air gap G divided into 2N=24 elements or samples, divided into four groups of six samples numbered from 1 to 6. The armature A comprises a central body 50 of ferromagnetic material of magnetic potential τ=0. The presence of a central ferromagnetic body is advantageous from the mechanical point of view in that this body lends itself well to the coupling of the armature A to a shaft.

The armature A of the machine according to FIG. 9b then includes another eight bodies of ferromagnetic material in equal pairs, indicated with the numerals 51–54. Between the ferromagnetic bodies of the armature are defined eight spaces, in equal pairs, indicated 55–59, in which are disposed respective equal pairs of magnets indicated 60–63.

With respect to the machine shown in FIG. 9a, the machine of FIG. 9b has a lower structural complexity, the advantage of a central ferromagnetic body in the armature, and lower armature losses. This compares with a reduction in the available degrees of freedom in the definition of the characteristics of the machine, which nevertheless still remain rather high.

Still with reference to FIG. 9b, in cases in which it is intended to apply equations (5d) and (5e) to obtain a machine provided with better defluxability capable of drastically limiting the so-called short-circuit current, that is to say the current which flows in the winding upon three phase short-circuit at high speed, it is possible to obtain a particular reduction in complexity by eliminating the magnets 61 positioned between bodies 51 and 52, by suitably dimensioning the mechanical and magnetic connections between these bodies. In fact, the application of equation (5a) in a narrow sense, and the resultant potential $\tau_2$ given by (5b), leads to the following result:

$$|\tau_3| < |\tau_2| \quad (5f)$$

In addition to the application of (5e) by which the elimination of magnets 61 is possible whilst applying conditions a) and c).

With a partial derogation from the quadrature condition b) and monotonicity condition c) it is likewise possible also to eliminate the magnets 63 between the bodies 53 and 54.

In FIG. 9c is shown another synchronous machine having symmetrical armature with n=N=12. This machine, like that previously considered, has an armature with a central body 70 of ferromagnetic material of magnetic potential τ=0. The armature A then includes another four bodies of ferromagnetic material in equal pairs, indicated 71 and 72. Between the armature bodies are defined four spaces in equal pairs 73 and 74, in which are lodged respective permanent magnets, also in equal pairs 75 and 76.

The machine shown in FIG. 9c possibly represents the optimal synchronous machine arrangement. In effect it presents a relatively structural simplicity, the advantage of the central ferromagnetic body in the armature, rather low armature losses, and a low number of permanent magnets. The number of parameters available nevertheless remain sufficiently high to satisfy the functional requirements and achieve maximum torque density (or force).

By imposing the conditions relative to the armature structure shown in FIG. 9c the equation (4a) remains unaltered in that it is independent of the armature structure; associated with it is the following equation which relates the internal permeances, thus providing the complete solution of the system of two general equations (3a) and (3b):

$$\wp_{10} = p_2 \frac{p_2\left(\wp_{12} + p_3 + p_4 + p_5 + \frac{p_6\left[\frac{1}{4} - \cos^2\left(\frac{5}{12}\pi\right)\right] + \wp_{12}\left[F5 - 2\cos\left(\frac{5}{12}\pi\right)\right]}{(F0^2 - F5^2)}\right) - \wp_{12} - p_2$$

where:
- $p_{10}$ is the magnetic permeance between the layer at zero magnetic potential (numbered 0) and the subsequent layer (numbered 1),
- $p_{12}$ is the magnetic permeance between layer 1 and the next layer (numbered 2),
- F0 is a parameter having the following expression:

$$F0 = \left[(p_3 + p_4)\cos\left(\frac{\pi}{4}\right) + (p_5 + p_6)\cos\left(\frac{\pi}{12}\right)\right], e$$

F5 is a parameter having the following expression:

$$F5 = \left[p_3 \cos\left(\frac{\pi}{3}\right) + (p_4 + p_5)\cos\left(\frac{\pi}{6}\right) + p_6\right].$$

Finally, equation (4b), derived from (3e), can be developed as follows:

$$\tau_{3-6}\left[\left(1 - \cos\frac{\pi}{12}\right)p_6 - \left(\cos\frac{\pi}{12} - \frac{\sqrt{3}}{2}\right)p_5 + \left(\frac{\sqrt{3}}{2} - \frac{\sqrt{2}}{2}\right)p_4 - \left(\frac{\sqrt{2}}{2} - \frac{1}{2}\right)p_3\right] + \tau_2\left(\frac{1}{2} - \cos\frac{5\pi}{12}\right)p_2 = 0$$

Where:
- $\tau_{3-6}$ represents the common magnetic potential of the samples 3, 4, 5, 6.

The application to this machine of conditions a), b), c) extended in the sense of obtaining the maximum performances of torque density, finally requires that the distribution of the permeances $p_3$, $p_4$, $p_5$ satisfies the following system of inequalities:

$$p_5 > p_4 > p_3$$

and, $p_2$ and $p_1$ being determined according to condition d), $p_6$ results from the imposition of equation (4a).

In general, $p_6$ is very much less than the maximum values represented by $p_2$ or $p_5$ so that the control of the magnetic conduction in the teeth is effectively possible in correspondence with seven armature samples, equivalent to 7/12 of the pole pitch, straddling the axis o, of which five on one side (FIG. 9c with 1, 2, 3, 4, 5 starting from the axis o and proceeding in one sense) and two from the other side (starting from the axis o and proceeding in the other sense to cover the samples 1 and 2 in FIG. 9c).

Similar considerations apply for the machine shown in FIG. 9d, which is again of the type with n=N=12. This machine is different from that of FIG. 9c essentially by the fact that the armature A has an additional pair of bodies, that is to say in addition to a central ferromagnetic body 80, six ferromagnetic bodies in equal pairs 81 to 83. Between the armature bodies are defined six spaces in equal pairs 84–86, in which are located respective permanent magnets 87–89 also in equal pairs.

With respect to that previously considered, the machine of FIG. 9d has a slightly more complex structure, a higher number of armature bodies and permanent magnets, and a correspondingly higher number of degrees of freedom in the definition of its characteristics.

In this machine configuration each magnet 89 has the function of extending, with respect to the configuration of the machine of FIG. 9c described above, the control of the induction also to one of the two samples 6 adjacent to the axis m.

In this way the control of the induction, as expressed by the principle or condition a), can extend to eight samples numbered 1, 2, 3, 4, 5, 6 in FIG. 9d starting from the axis o proceeding in one sense and 1, 2 starting from the axis o proceeding in the opposite sense, this extent corresponding overall to 2/3 of the pole pitch.

Moreover, since the permeance $p_6$ at the air gap is discretely less than the maximum permeance at the air gap, represented by $p_2$ or $p_5$, the control of the induction according to condition a) in a non strict (or narrow) form, and in any event according to condition c), extends almost up to nine samples (7+2) comprising in practice both the samples 6 adjacent to the axis m; this extent corresponds approximately 3/4 of the pole pitch.

In other applications the maximum torque density cannot be given priority, in favour of other characteristics such as the power density, that is to say the efficiency at high speed, or the so-called defluxability, that is to say the possibility of supplying-the machine at constant voltage and power over a given speed range of relative movement between inductor and armature.

In such cases the reduction of torque density, or rather the application of the conditions a) and b) in a minimal and non strict manner, offers further degrees of freedom to increase output and defluxability.

Figure 9E:
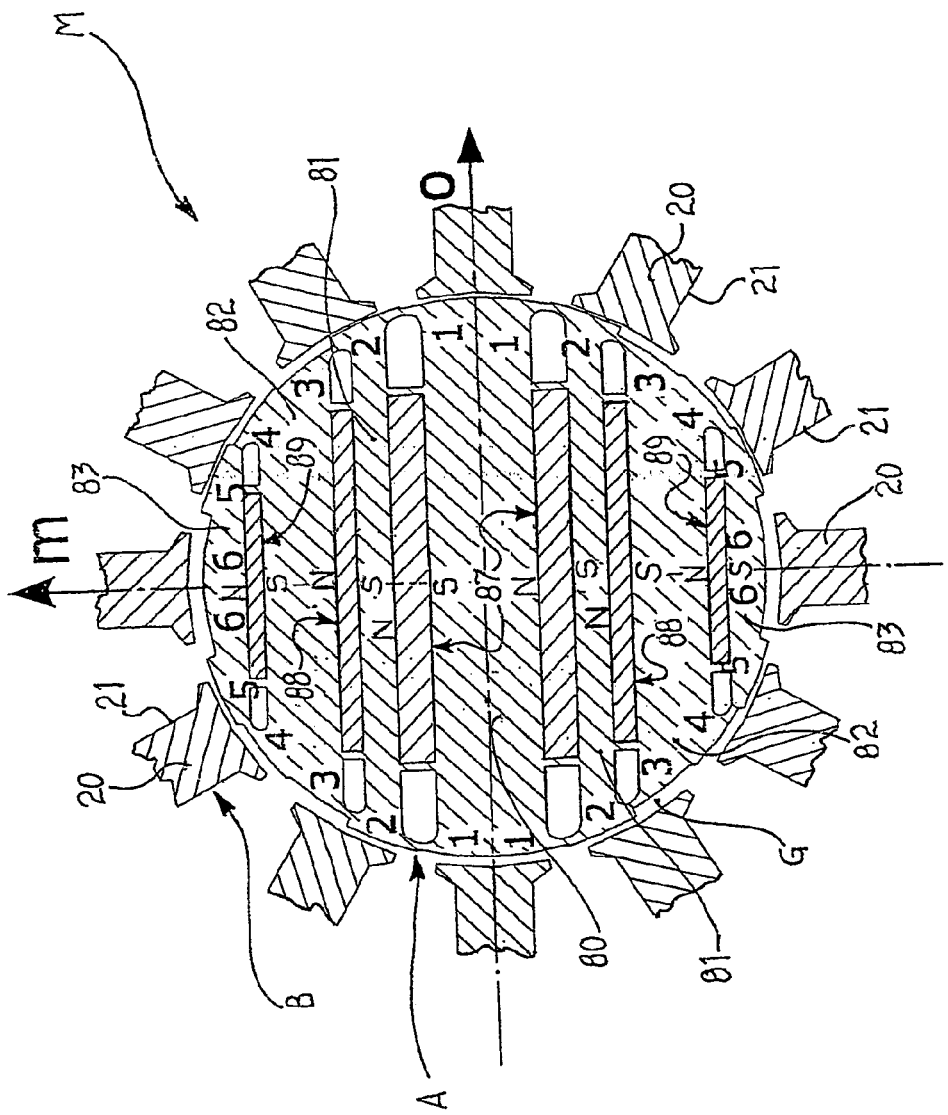

For example, in FIG. 9e is shown a structure again having a central body 80 at τ=0 obtained by joining the bodies which access the air gap through the samples 1, as well as another two so-called "even" bodies 82 obtained by joining the samples 3 and 4 and another two "even" bodies 83 obtained by joining the samples 5 and 6. All these bodies have reduced losses in the ferromagnetic material of which they are formed. The only "odd" bodies, necessary and sufficient according to the invention, are the bodies 81 which access the air gap through the samples 2.

In machines with symmetrical armatures with n=12 and N=24 it is possible to obtain analogous and more refined quantitative and qualitative characteristics by virtue of the very high number of available parameters. In fact, it is possible to obtain the best characteristics of the machine with n=N=12 and a central body with $\tau=0$ through simplified armature structures.

One example is shown in FIG. 9f where by numbering the samples from 1 to 12 starting from each half axis o towards each half axis m, the central body at $\tau=0$ in this case comprising only the samples 1, has an extent halved with respect to the case of N=12 as well as a single odd body comprising the three samples from 2 to 4, separate from the upper body comprising all the remaining samples from 5 to 12.

Machines with Symmetrical Armature with n>12

These are in general of less interest in that they are inefficient for the conversion of currents into m.m.f in the inductor. According to the invention, the further increase in the degrees of freedom in design management, obtainable with n>12 is not particularly advantageous in comparison with what is obtainable from the increase of N with respect to n. In any case the greater number of degrees of freedom can be managed in a similar manner to that indicated with reference to the case of n=12.

Machines with Asymmetrical Armature

We now consider machines having asymmetrical armature with no axis of specular symmetry.

Such machines can be suitable in applications which are likewise asymmetrical in terms of torque (or force) required, in the limit with a single sign or rather with a stringent specification relating to a single sign of the torque (or force).

For this category of machine all the above-indicated relations (3a÷3e) are valid, all the parameters appearing here being in general different from zero.

In general, in this case also, the system of three sets of equations 3a), 3b) and 3c) can conveniently be transformed into another system of three sets of equations in two of which only the permeances at the air gap $p_i$ appear whilst in the third the internal permeances $P_{gj}$ also appear.

In addition to the five relations (3a–3e), the previously-discussed conditions a), b) and c) are conveniently also valid for these machines, applied however to the torque of single sign required or specified for the best performance.

In each case, a total asymmetry involves the fact that the total independent magnetic permeances $p_i$ are in number equal to 2N.

On the other hand, a case of high practical interest is represented by machines which, whilst not having any axis of specular symmetry, nevertheless have poles, of opposite magnetic polarity, mutually symmetrical with respect to the centre of rotation, in the case of rotating machines. In this case the number of total independent magnetic permeances $p_i$ is halved, becoming equal to N.

Similar considerations can be made for all the other internal parameters $\tau_j$ and $P_{gj}$ which then halve in number, in the case of symmetry with respect to the centre.

Overall, for machines having a symmetric armature, the parameters $\tau_j$, $p_i$ and $P_{gj}$ are therefore more numerous, but also subject to a higher number of conditions than in the case of machines having a symmetrical armature. In general there are more degrees of design freedom, which can be conveniently utilised for example to achieve reductions in cost and/or improved performance.

Machines without any axis of specular symmetry are particularly interesting in that they allow the use of even simpler armatures whilst conveniently increasing the number of degrees of freedom.

Machines with central symmetry with n=12

A case of particular interest is obtained for n=N=12 and with symmetry with respect to the centre.

In this case the system of equations from 3a) to 3c) is re-expressed as a system composed of two equations including only $p_i$ as follows:

$$[(p_1+p_{12})-(p_6+p_7)]-(1+\sqrt{3})[(p_2+p_{11})-(p_5+p_8)]++(2+\sqrt{3}))[(p_3+p_{10})-(p_4+p_9)]=0 \quad (6a)$$

$$[(p_1-p_{12})+(p_6-p_7)]-(\sqrt{3}-1)[(p_2-p_{11})+(p_5-p_8)]++(2-\sqrt{3})[(p_3-p_{10})-(p_4-p_9)]=0 \quad (6b)$$

as well as a third equation also correlating the $P_{gj}$, which necessarily depends, as previously mentioned, on the number of magnetically distinct bodies into which the armature is divided.

Equations 3d) and 3e), moreover, having defined:

$$b_i = \tau_j p_i;$$

are re-expressed as follows:

$$\sin(\frac{\pi}{12})(b_6 - b_7) + \left[\sin(\frac{\pi}{12}) - \frac{1}{2}\right] \quad (6c)$$

$$(b_5 - b_8) + \left[\frac{\sqrt{2}}{2} - \frac{1}{2}\right](b_4 - b_9) +$$

$$+ \left[\frac{\sqrt{2}}{2} - \frac{\sqrt{3}}{2}\right](b_3 - b_{10}) + \left[\cos(\frac{\pi}{12}) - \frac{\sqrt{3}}{2}\right]$$

$$(b_2 - b_{11}) + \left[\cos(\frac{\pi}{12}) - 1\right](b_1 - b_{12}) = 0$$

$$\left[1 - \cos(\frac{\pi}{12})\right](b_6 + b_7) + \left[\frac{\sqrt{3}}{2} - \cos(\frac{\pi}{12})\right] \quad (6d)$$

$$(b_5 + b_8) + \left[\frac{\sqrt{3}}{2} - \frac{\sqrt{2}}{2}\right](b_4 + b_9) +$$

$$+ \left[\frac{1}{2} - \frac{\sqrt{2}}{2}\right](b_3 + b_{10}) + \left[1 - \text{sen}(\frac{\pi}{12})\right](b_2 + b_{11}) -$$

$$\text{sen}(\frac{\pi}{12})(b_1 + b_{12}) = 0$$

Figure 10A:
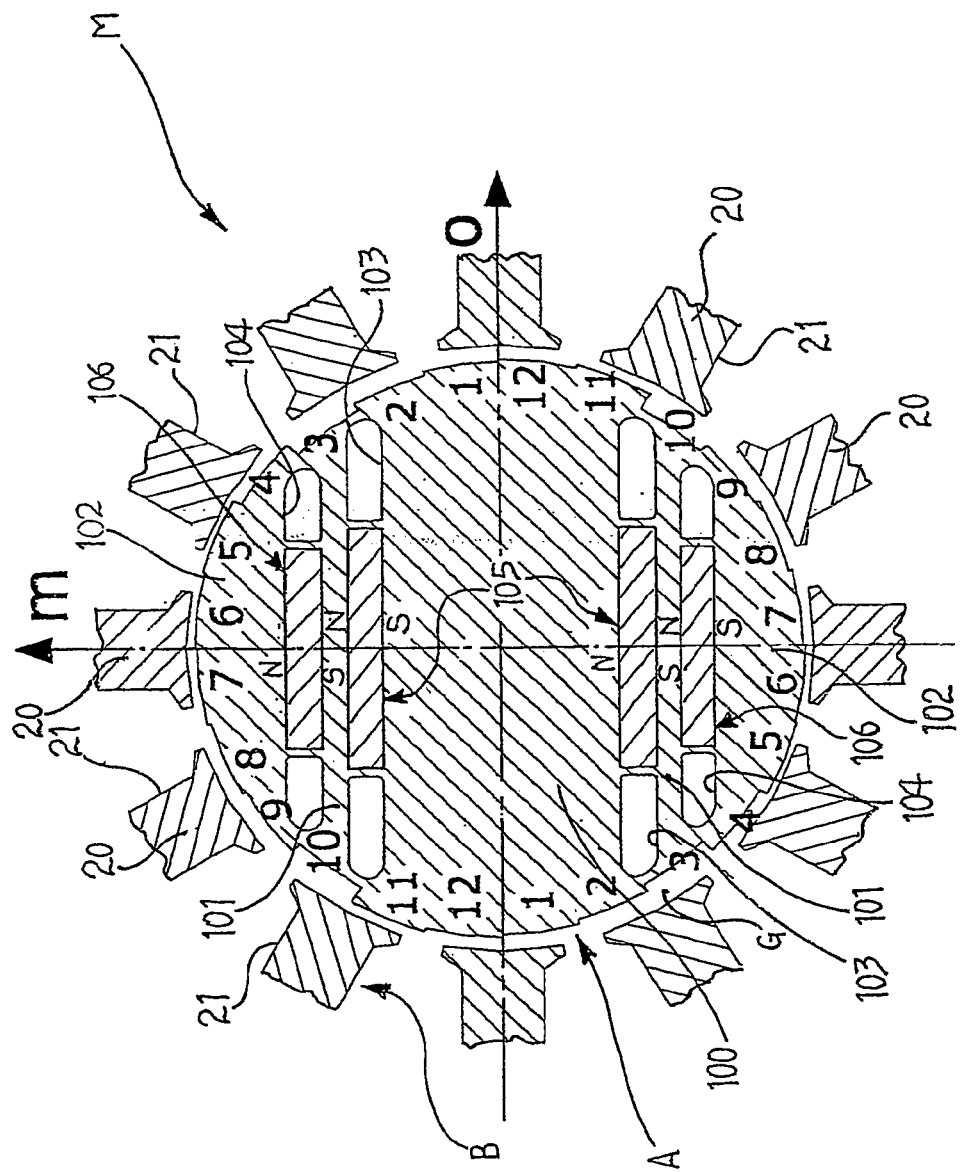
FIGS. 10 and 10b are sections of a synchronous machine with n=N=12 slots and inductor tooth structures and a pair of asymmetric armature poles.

In FIG. 10a is shown a machine M having asymmetric armature and central symmetry with n=N=12. The periphery of the armature A of this machine comprises 24 samples divided into two groups of 12 numbered from 1 to 12.

The armature A comprises a central body 100 of ferromagnetic material which at each of its ends has an angular extent equal to four samples. The armature A further includes another four ferromagnetic bodies, in equal pairs, 101 and 102.

Between the ferromagnetic bodies of the armature A are defined four spaces in equal pairs, 103 and 104, in which are located respective magnets, also in equal pairs 105 and 106.

The machine shown in FIG. 10a has almost optimal characteristics: high mechanical robustness, low losses, small number of parts and in particular of permanent magnets, easy coupling to a shaft, high number of degrees of design freedom, also maintaining a certain functionality even in relation to the direction of torque opposite to the design direction.

Figure 10B:
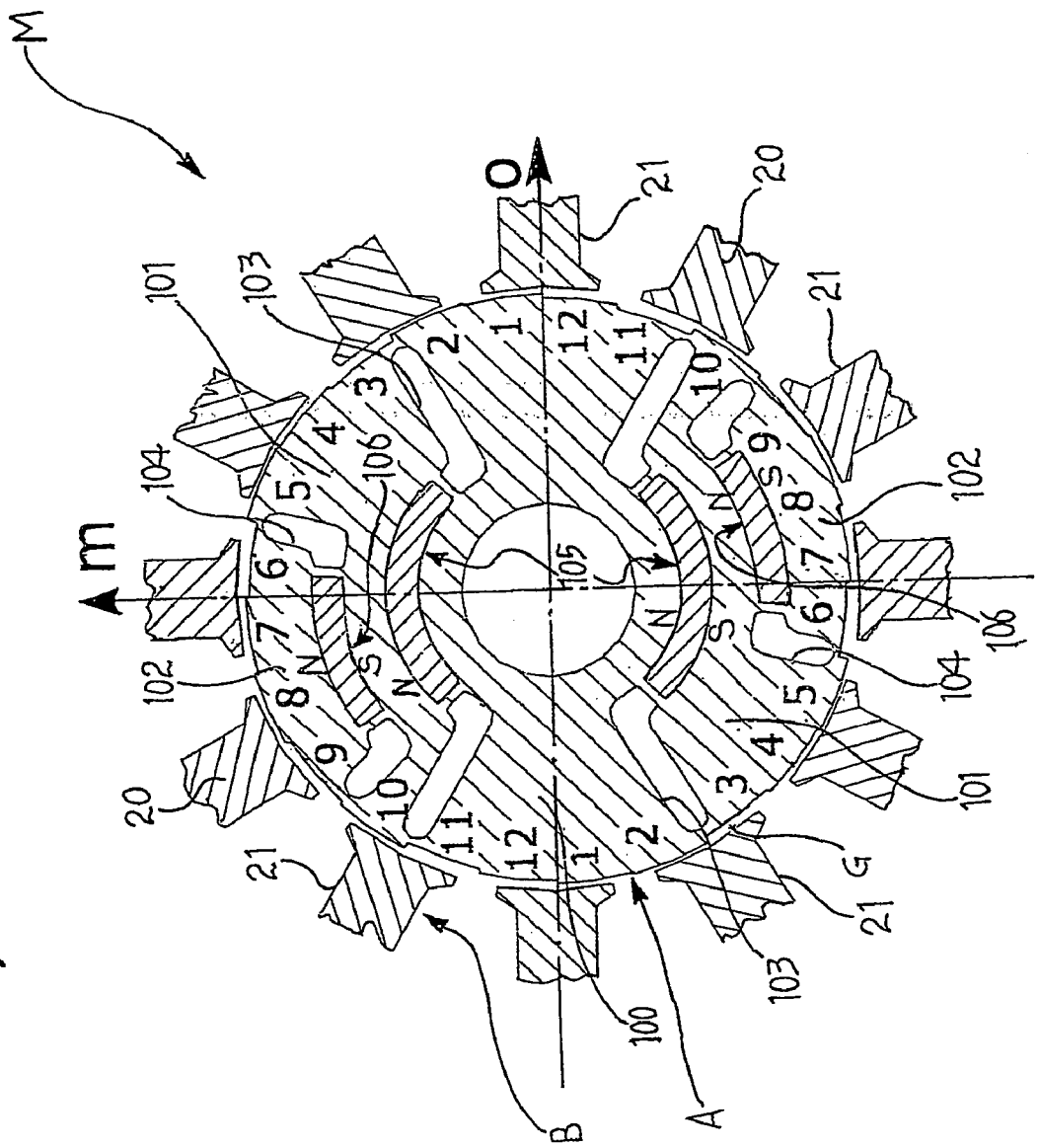

In FIG. 10b is shown another embodiment of a synchronous machine having an asymmetrical armature pole with symmetry with respect to the centre, with n=N=12, characterised by more sharply asymmetric performance. In this figure, the parts and elements essentially corresponding to those of the machine according to FIG. 10 have been again allocated the same reference numerals.

In the machine according to FIG. 10b the central body 100 at τ=0 of the armature A extends, at each of its two ends, over four samples. The outer ferromagnetic bodies 102 have an extent of four samples each, rather than six as in the machine of FIG. 10a. Moreover, the intermediate ferromagnetic bodies 101 extend at one end over a single sample, and over three samples at the other end.

The machine according to FIG. 10b also has essentially the same advantageous characteristics explained above in relation to the machine of FIG. 10a, however with construction and application details which can make it preferable.

Machines with Specular Symmetry Solely with Respect to the Axis m and with n=12

A further case of particular practical interest is represented by machines which have differentiated poles for which each pole separation axis o is not an axis of specular symmetry, but in which each pole is specularly symmetrical with respect to the axis m.

In such machines the number of free parameters is higher than for machines with symmetrical armature. However, if the number n of slots is even, the torque characteristics of the machine remain completely symmetrical.

Figure 11:
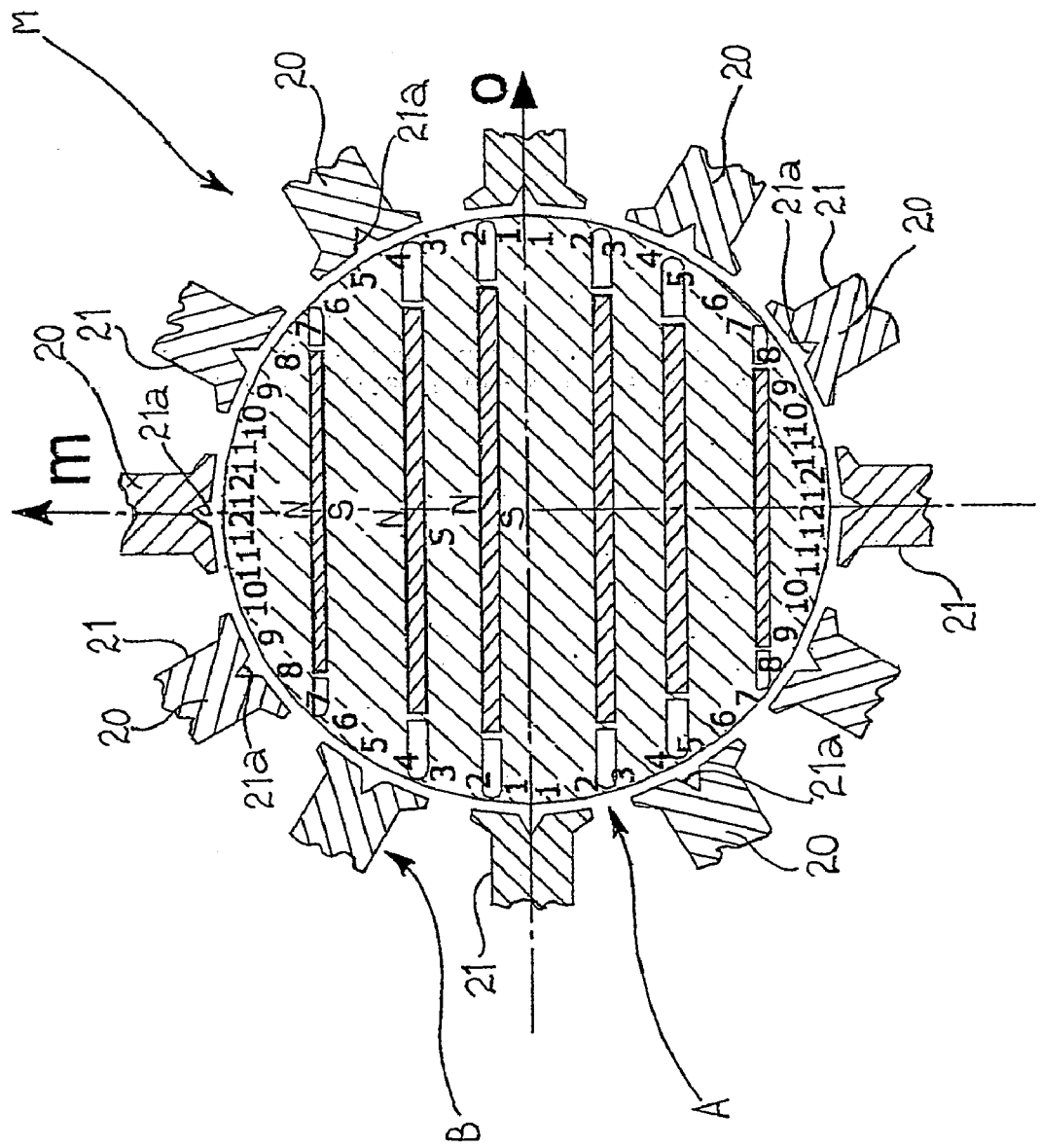
FIG. 11 is a partially sectioned view of a synchronous electric machine according to the invention with n=12 slots and N=24 inductor tooth structures and a pair of asymmetric armature poles.

A machine of this type according to the invention is illustrated in FIG. 11 where n=12 (even) and N=24.

The pole denominated positive in which the axis of symmetry is m is different from the pole denominated negative in which the axis of symmetry is −m.

In both poles three different bodies are distinguished from the central body on which the axis o lies. In the negative pole (i.e. the lower one in FIG. 11) a first body is obtained involving the samples from 8 to 12 and those specularly symmetric with respect to the axis −m, a second from 5 to 7 and a third comprises the samples 3 and 4, whilst in the positive pole a first body comprises the samples from 7 to 12, a second from 4 to 6 and a third only the samples 2 and 3.

The armature has a central body which is not at zero magnetic potential but can perform identical mechanical functions and which includes the samples 1 (positive), 1 (negative) and 2 (negative).

All the equations 3a÷3e can be applied to this machine as can all the conditions from a) to d) as for the other preceding cases, for each or for both signs of torque, equally, by virtue of the even number of slots n.

In the machine of FIG. 11 it is possible to achieve a distribution of magnetic permeance values ($p_i$) at the air gap (G) associated with the armature samples presenting a local minimum in a field which extends for a width equal to three samples about the axis (o) or at each armature pole separation axis, such pole separation axis or each pole separation axis being coincident or close, within more or less one sample, to the axis along which the maximum self inductance value present at the terminals of the inductor winding is found.

In this case the values of magnetic permeance ($p_i$) at the air gap (G) conveniently increase along the air gap (G) in both directions starting from the said local minimum, this distribution of magnetic permeance ($p_i$) having its absolute maximum value at armature samples lying between the said or each armature pole separation axis (o) and the adjacent axes (m) which are in quadrature with the said armature pole separation axes (o).

Arrangements on the Inductor for the Cancellation of "Sub Harmonic" Ripple

In general, in machines with n=12 with symmetrical or asymmetrical armature poles, the cancellation of the ripple of period 2P (P being the slot pitch) of the magnetic parameters along the direction of relative movement between inductor and armature is achievable by forming the slots in the inductor B in such a way that they have a differentiated form as will be described now with reference to FIGS. 12 and 13.

Figure 12:
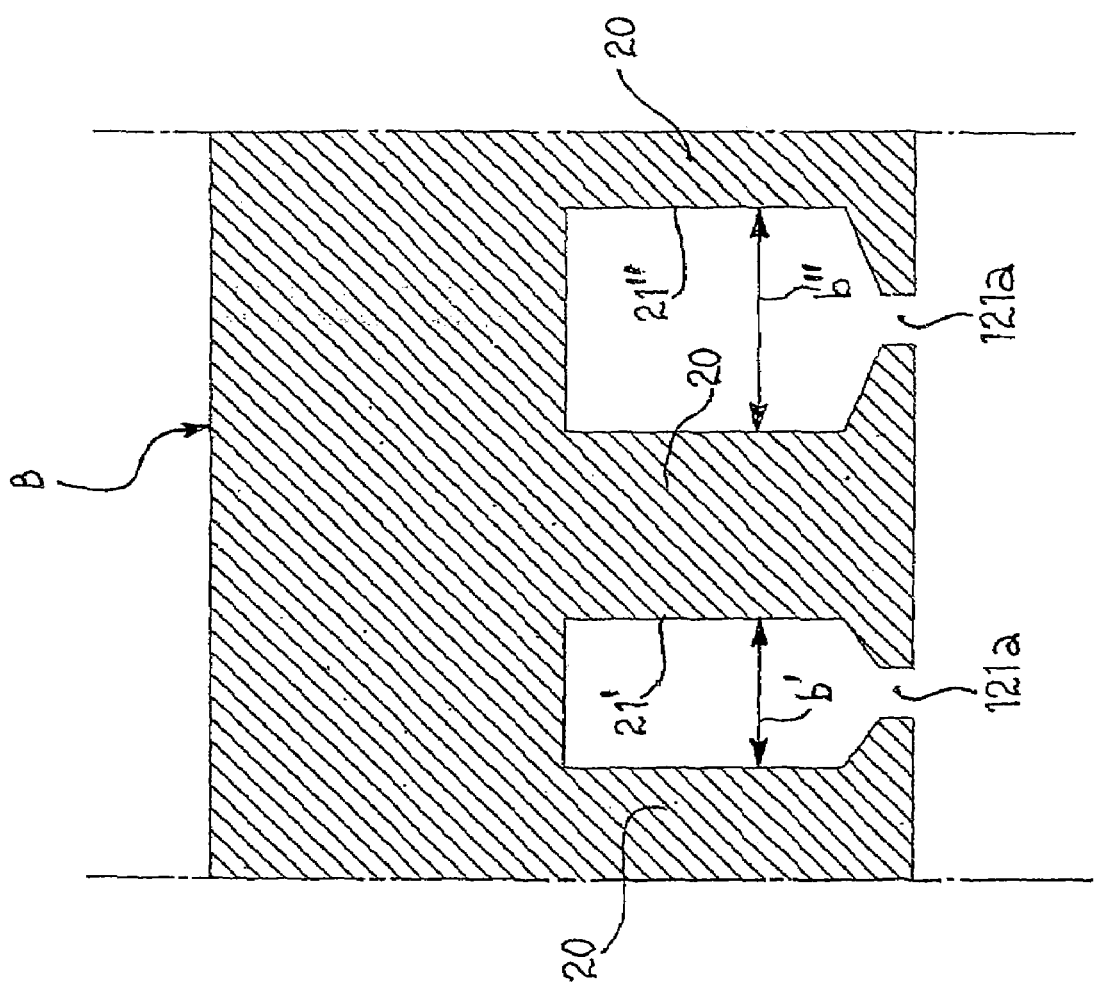
FIG. 12 is a partially sectioned view which shows a linearised portion of the inductor of a synchronous machine.

In FIG. 12 there is shown a linearised portion of the inductor B with two adjacent slots 21' and 21" having different widths b' and b". These slots lie between ferromagnetic tooth structures 20 having essentially identical dimensions and specular shape with respect to the axis of the slot, and in any event having respective teeth 20a at the air gap which have the same extent in the direction of relative displacement between inductor and armature. The mouths 121a of the slots 21' and 21" also have the same extent along the said direction of relative displacement.

Conveniently, to obtain a substantial cancellation of the ripple and at the same time a maximum efficiency of the machine, the slots of the inductor B have alternating widths which relate to one another substantially in the ratio $\sqrt{3}/2$, like the widths indicated b' and b" in FIG. 12.

Figure 13:
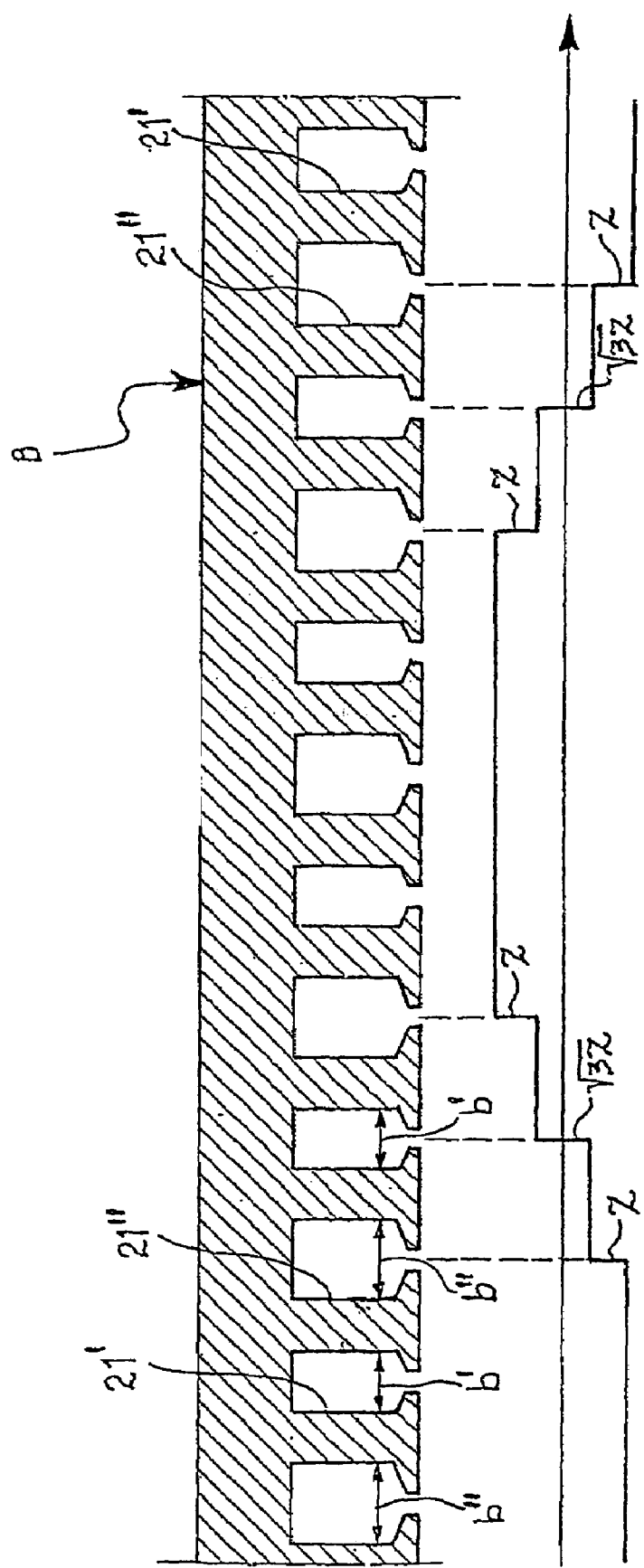
FIG. 13 is a linearised representation of the inductor of a synchronous machine the slots of which are formed in conformity with the arrangement described in relation to FIG. 12, with an associated graph relating to the distribution of the conductors of an inductor winding.

FIG. 13 shows a linearised inductor formed with slots having different widths as described above.

The graph in the lower part of FIG. 13 conventionally represents the distribution of the conductors of the winding of one phase of the inductor B in a three phase synchronous motor according to the invention, designed to obtain maximum performance. This figure shows, along the ordinate, the m.m.f produced by one of the three phases, the variations of which are correlated with the number of conductors disposed in the slots, as a function of the position co-ordinate (along the direction of relative displacement between inductor and armature) plotted on the abscissa, and referred to the linearised portion of the inductor shown in FIG. 13.

In each "narrow" slot 21' of the inductor having width b' are housed $\sqrt{3}z$ conductors of a single phase, z conductors of the same phase being lodged in the two contiguous "wider" slots 21" having width b". The slots 21" are wider in that they must also receive z conductors of another of the three phases. The insulation between the phases can require that b" be in practice slightly greater than $2b'/\sqrt{3}$ whilst the insulation of the ferromagnetic tooth structures of the inductor reduces this increase.

The absence of so-called "sub harmonics" (period 2P) of said distribution of conductors can be deduced, among other things, from the cancellation of the so-called "bight" of the fifth and seventh harmonic of the phase distribution. The width $Z_h$ of the "$h_{th}$" harmonic being described by:

$$Z_h = \frac{4}{\pi}z\left[\frac{\sqrt{3}}{2} + \cos h\frac{\pi}{6}\right]\frac{1}{h} \forall\ h\ \text{odd},$$

it can be noted that for h=5, 7 $Z_5=Z_7=0$

The fundamental component on the other hand is:

$$Z_1 = \frac{4}{\pi}\sqrt{3}\,z$$

for which the relationship between fundamental amplitude and maximum value of the conductor distribution is:

$$\frac{Z_1}{\left(1+\frac{\sqrt{3}}{2}\right)z} = \frac{4}{\pi}\frac{2\sqrt{3}}{2+\sqrt{3}} = \frac{4}{\pi}2\sqrt{3}\,(2-\sqrt{3}) = \frac{4}{\pi}0.9282$$

By comparison, and as known, starting from the usual distribution of short pitch conductors in which two identical contiguous slots house z conductors of one phase, by inserting a number kz of conductors in the two slots contiguous to the first two it is possible to cancel the bight of fifth and seventh harmonic.

This transition of the conductor distribution is also known as (1, 3, 3, 1) in that the harmonic content of the transition (kz, z, z, kz) is described analytically thus:

$$Z'_h = \frac{4}{\pi}z\left[\cos h\frac{\pi}{12} + k\,\cos h\frac{\pi}{4}\right]\frac{1}{h} \forall\ h\ \text{odd}$$

for which the bight of fifth and seventh cancels for k=0.3660, that is to say $$\frac{\sqrt{3}-1}{2},$$

a number which in practice is well approximated by ⅓. However the relationship between the fundamental amplitude and the maximum amplitude of the conductor distribution gives:

$$\frac{Z'_1}{z(1+0{,}366)} = \frac{4}{\pi}\frac{\cos\frac{\pi}{12} + \frac{1}{2}(\sqrt{3}-1)\cos\frac{\pi}{4}}{1+\frac{1}{2}(\sqrt{3}-1)} = \frac{4}{\pi}0.8965$$

In summary, by making the inductor according to the invention it is possible to increase by 3.5% the co-efficient of conversion of the current to m.m.f, or rather to reduce by about 7% the copper losses for the same fundamental m.m.f. produced.

The transition of the distribution of conductors according to the invention can be described in principle by the sequence (1, √3, 1). Various integer numbers are able to approximate it with good accuracy, the smallest integer number with common factor being equal to 3, thus obtaining in this case the approximated sequence (3, 5, 3).

Other sequences are obviously obtainable with larger integers, including (4, 7, 4), (7, 12, 7), (8, 13, 8), (11, 19, 11) etc, being particularly accurate.

Naturally, the principle of the invention remaining the same, the embodiments and details of construction can be widely varied with respect to what has been described and illustrated purely by way of non-limitative example, without by this departing from the scope of the invention as defined in the annexed claims.

The invention claimed is:

1. A synchronous electric machine (M), comprising an armature (A) and an inductor (B) between which is defined an air gap (G);
    the armature (A) having at least one pair of poles (N, S);
    the inductor (B) having, for each pair of poles (N, S) of the armature (A), n identical ferromagnetic tooth structures (20) and n slots (21), alternating with one another and each having at the air gap (G) a respective, essentially constant, extent in the direction of relative displacement between inductor (B) and armature (A); the inductor (B) being provided with a winding (W) housed in the said n slots; the machine (M) being characterised in that:
    the surface of the armature (A) facing the air gap (G) is divided into 2N elements or samples (1–12), with N being an integer multiple of n, having substantially the same extent in the said direction of relative displacement;
    each of the said ferromagnetic tooth structures of the inductor having at the air gap a sequence of teeth (20a) of substantially constant extent along the said direction of relative displacement, separated by at least one pseudoslot (21a), so that the surface of the inductor for each pair of poles has at the air gap overall N teeth (20a) separated by N intervals, of which n are constituted by the openings to the air gap of the said n slots and (N-n) are constituted by the openings to the air gap of the said pseudoslots (21a);
    each sample (1–12) of the armature (A) having a respective magnetic potential value ($\tau_i$) essentially constant over the extent of the sample;
    each sample (1–12) of the armature (A) is associated with a respective total value of magnetic permeance ($p_i$) at the air gap (G) in a predetermined alignment condition or relative position between the inductor (B) and the armature (A) in which the sample extends between the axis of one tooth and the intermediate axis between this tooth and an adjacent tooth at the air gap (G);
    the armature (A) includes a plurality of magnetically distinct bodies (30, 31, 32; . . . ) of ferromagnetic material, each of which couples at least two armature samples in such a way as to ensure a substantial magnetic equipotentiality;
    the magnetic potentials ($\tau_i$) of the single samples (1–12) of the armature (A) and the said values of total magnetic permeance ($p_i$) associated with them being determined according to predetermined criteria,
    in which the inductor (B) is formed in such a way that it is able to generate a magnetomotive force distribution which is seen by the armature (A) identically in all relative positions which are separated from one another by one slot pitch (P), and
    in which in the 2N/n possible alignment conditions for each sample (1–12) in a slot pitch (P), the values of all the magnetic parameters ($L_o$, $L_m$, $L_{om}$, $\Psi_o$, $\Psi_m$) of the electric machine calculated in the components along two separate axes (o,m) for example in quadrature with one another, fixed to the armature, are substantially equal to one another in the said 2N/n alignment conditions.

2. An electric machine according to claim 1, in which, having assigned to the armature samples (1–12) respective even and odd positions alternately on the surface facing the air gap (G) along the said direction of relative displacement, for each body (31, 32; . . . ; 101, 102) of the armature (A) having magnetic potential (τ) substantially different from zero the sum of the total magnetic permeances ($p_x$) of the samples in even positions is substantially equal to the sum of the total magnetic permeances ($p_y$) of the samples in odd positions.

3. An electric machine according to claim 1, in which the armature (A) comprises at least one ferromagnetic body defined as "odd" (30; 40; 51; . . . ; 101) which faces the air gap (G) through two non-contiguous sets of samples, each of which comprises an odd number of contiguous samples (1).

4. An electric machine according to claim 1, in which:

$$L_{o,k} \cong \text{cost}$$

$$L_{m,k} \cong \text{cost}$$

$$L_{om,k} \cong \text{cost}$$

$$\Psi_{o,k} \cong \text{cost}$$

$$\Psi_{m,k} \cong \text{cost}$$

with k=1, 2, . . . 2N/n
in which:
$L_{o,k}$ are the values of self-inductance measured, in the said 2N/n alignment conditions, along a first axis (o) corresponding to the armature (A) pole separation axis (N, S);
$L_{m,k}$ are the self-inductance values measured, in the said 2N/n alignment conditions, along a second axes (m) in quadrature with the separation axis (o) of the poles (N, S) of the armature (A);
$L_{om,k}$ are the mutual coupling values between magnetomotive forces and fluxes along the said first and second axes (o, m) in the said 2N/n alignment conditions;
$\Psi_{o,k}$ are the values of the flux linked by the windings (W) of the inductor (B) along the said first axis (o) in the said 2N/n alignment conditions; and
$\Psi_{m,k}$ are the values of the flux linked by the windings (W) of the inductor (B) along the said second axis (m) in the said 2N/n alignment conditions.

5. An electric machine according to claim 1, in which the teeth of the inductor (B) have, at the surface facing the air gap (G), an extent which, along the said direction of relative displacements, has a magnitude close to ¾ or ⅞ of the tooth pitch.

6. An electric machine according to claim 1, in which the armature (A) comprises at least two axial armature portions which are offset from one another in the said direction of relative displacement.

7. An electric machine according to claim 6, in which the said at least two portions of the armature (A) have respective different transverse sections.

8. An electric machine according to claim 7, in which the said at least two portions of the armature (A) have respective different axial lengths.

9. A machine according to claim 7, in which two portions of the armature (A) are offset from one another by about one quarter of the tooth pitch of the inductor (B).

10. An electric machine according to claim 6, in which the armature (A) comprises four axial armature portions, which in the said direction of relative displacement are offset from one another by ⅛ of the tooth pitch.

11. An electric machine according to claim 1, dimensioned to deliver in operation a maximum predetermined torque ($T_M$), and in which the armature (A) is formed in such a way that when the machine (M) operates delivering a torque close to the said maximum torque ($T_M$), in each of the 2N/n possible alignment conditions for each sample in a slot pitch the distribution of induction in the ferromagnetic tooth structures (20) of the inductor (B) has values substantially close to, and preferably less than, the saturation induction value of the ferromagnetic tooth structures (20) of the inductor (B) over at least half of the pole pitch of the armature (A), and preferably not more than ¾ of the pole pitch of the armature (A).

12. A synchronous electric machine according to claim 11, in which in each of the said alignment conditions the said distribution of induction is substantially in quadrature with the distribution of magnetic potential generated by the inductor (B) at the said ferromagnetic structures of the inductor (B).

13. A synchronous electric machine according to claim 11, in which in each of the said alignment conditions the said distribution of induction has a substantially monotonically increasing variation over an extent equal to about one pole pitch of the armature (A) and a substantially monotonically decreasing variation for the subsequent or preceding pole pitch.

14. An electric machine according to claim 1, in which the distribution of the magnetic permeance values ($p_i$) at the air gap (G) associated with the armature samples has a local minimum in a field which extends for a width equal to three samples about the axis (o) or each pole separation axis of the armature, being such axis or each pole separation axis coinciding or being close, within more or less one sample, to the axis along which the maximum self-inductance value present at the terminals of the inductor winding is found.

15. A synchronous electric machine according to claim 14, in which the values of magnetic permeance ($p_i$) at the air gap (G) increase along the air gap (G) in both directions starting from the said local minimum; this distribution of magnetic permeance ($p_i$) having the absolute maximum value at armature samples lying between the said or each armature pole separation axis (o) and the adjacent axes (m) which are in quadrature with the said armature pole separation axis (o).

16. An electric machine according to claim 1, in which each pole axis (m), in quadrature with each pole separation axis (o) is an axis of geometrical and magnetic symmetry.

17. An electric machine according to claim 16, in which each pole axis (m) and each pole separation axis (o) is an axis of geometrical and magnetic symmetry.

18. An electric machine according to claim 16, in which each axis (o) is not an axes of geometric and magnetic symmetry.

19. An electric machine according to claim 1, in which each pole axis (m) and each pole separation axis (o) is not an axis of geometric and magnetic symmetry but the armature is geometrically and magnetically symmetrical with respect to its axis.

20. An electric machine according to claim 1, in which each ferromagnetic inductor structure has one or at most two pseudoslots.

21. An electric machine according to claim 20, in which n=3 and N=9.

22. An electric machine according to claim 20, in which n=4 and N=12.

23. An electric machine according to claim 20, in which n=6 and N=12.

24. An electric machine according to claim 20, in which n=6 and N=18.

25. An electric machine according to claim 20, in which n=12 and N=24.

26. A synchronous electric machine (M), comprising an armature (A) and an inductor (B) between which is defined an air gap (G);

the armature (A) having at least one pair of poles (N, S);

the inductor (B) having, for each pair of poles (N, S) of the armature (A), n identical ferromagnetic tooth structures (20) and n slots (21), alternating with one another and each having at the air gap (G) a respective, essentially constant, extent in the direction of relative displacement between inductor (B) and armature (A); the inductor (B) being provided with a winding (W) housed in the said n slots; the machine (M) being characterised in that:

the surface of the armature (A) facing the air gap (G) is divided into 2N elements or samples (1–12), with N being an integer multiple of n, having substantially the same extent in the said direction of relative displacement;

each of the said ferromagnetic tooth structures of the inductor having at the air gap a sequence of teeth (20a) of substantially constant extent along the said direction of relative displacement, separated by at least one pseudoslot (21a), so that the surface of the inductor for each pair of poles has at the air gap overall N teeth (20a) separated by N intervals, of which n are constituted by the openings to the air gap of the said n slots and (N-n) are constituted by the openings to the air gap of the said pseudoslots (21a);

each sample (1–12) of the armature (A) having a respective magnetic potential value ($\tau_i$) essentially constant over the extent of the sample;

each sample (1–12) of the armature (A) is associated with a respective total value of magnetic permeance ($p_i$) at the air gap (G) in a predetermined alignment condition or relative position between the inductor (B) and the armature (A) in which the sample extends between the axis of one tooth and the intermediate axis between this tooth and an adjacent tooth at the air gap (G);

the armature (A) includes a plurality of magnetically distinct bodies (30, 31, 32; . . .) of ferromagnetic material, each of which couples at least two armature samples in such a way as to ensure a substantial magnetic equipotentiality;

the magnetic potentials ($\tau_i$) of the single samples (1–12) of the armature (A) and the said values of total magnetic permeance ($p_i$) associated with them being determined according to predetermined criteria, wherein the electric machine is dimensioned to deliver in operation a maximum predetermined torque ($T_M$), and wherein the armature (A) is formed in such a way that when the machine (M) operates delivering a torque close to the said maximum torque ($T_M$), in each of the 2N/n possible alignment conditions for each sample in a slot pitch the distribution of induction in the ferromagnetic tooth structures (20) of the inductor (B) has values substantially close to, and preferably less than, the saturation induction value of the ferromagnetic tooth structures (20) of the inductor (B) over at least half of the pole pitch of the armature (A), and preferably not more than ¾ of the pole pitch of the armature (A).

* * * * *